United States Patent [19]

Ohkawa

[11] 4,114,550
[45] Sep. 19, 1978

[54] APPARATUS FOR USE IN AN AUTOMATIC AND CONTINUOUS MANUFACTURE LINE FOR MANUFACTURING THE OUTER CYLINDRICAL CASES OF DRY CELLS

[75] Inventor: Kozo Ohkawa, Kawasaki, Japan

[73] Assignee: Toyo Seikan Kaisha, Ltd., Tokyo, Japan

[21] Appl. No.: 777,182

[22] Filed: Mar. 14, 1977

[51] Int. Cl.² .......................................... B21D 51/20
[52] U.S. Cl. ............................. 113/7 R; 113/11 R; 113/113 A
[58] Field of Search ............... 113/7 R, 7 A, 113 A, 113/11 R, 11 A, 120 R, 120 AA, 116 P

[56] References Cited

U.S. PATENT DOCUMENTS

| | | | |
|---|---|---|---|
| 1,153,434 | 7/1915 | Kruse | 113/113 A |
| 2,281,554 | 5/1942 | Collesan et al. | 113/7 R X |
| 2,413,594 | 12/1946 | White | 113/7 R |
| 3,053,209 | 9/1962 | Smith et al. | 113/7 R |
| 3,406,648 | 10/1968 | Armbruster | 113/7 R |
| 3,489,116 | 1/1970 | Maiorino | 113/7 R |

Primary Examiner—Leon Gilden
Attorney, Agent, or Firm—Frank J. Jordan

[57] ABSTRACT

Apparatus for use in an automatic and continuous manufacture line for manufacturing the outer cylindrical cases of dry cells comprising a former, line conveyors and a rotary flanger. Every rectangular blank shifted into the former is pre-formed by a pre-curl punch to form a desired arc and this pre-formed blank is then rolled around a forming roll to form a cylindrical body. The line conveyors serve to feed the cylindrical bodies discharged from the former in a horizontal direction, then in a vertical direction and then in a direction slanted downward in such a manner that the longitudinal axis of each of the bodies is always along the feeding direction, and to turn each of the bodies by 90° at the end of the line conveyors. The rotary flanger receives each of the bodies continuously fed from the line conveyors in each of recesses provided around the outer circumference of a rotary feed turret and presses both ends of the body in such a manner that only one end of the body is bent inward to form a flange of an outer cylindrical case.

23 Claims, 42 Drawing Figures

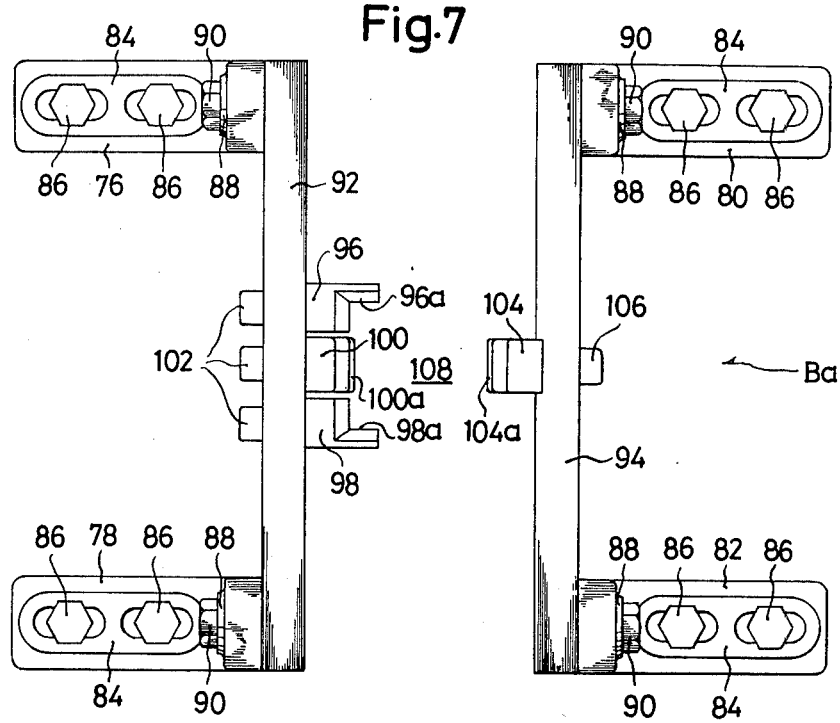
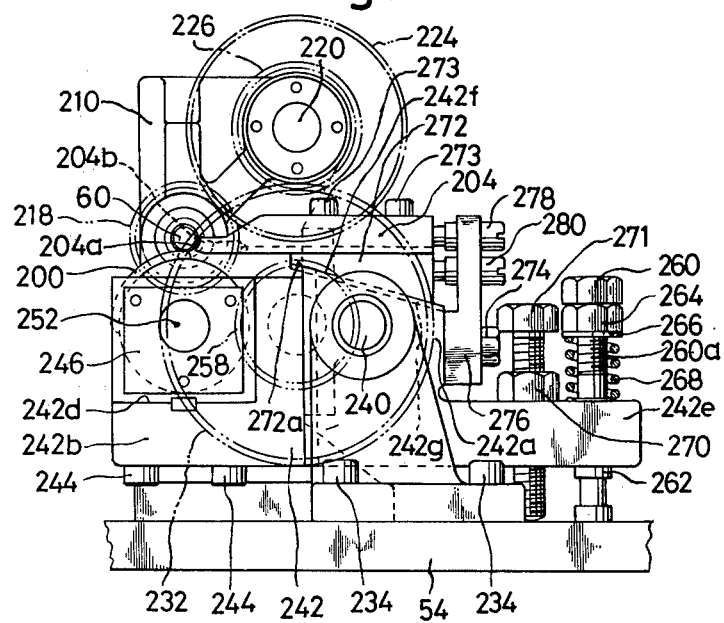

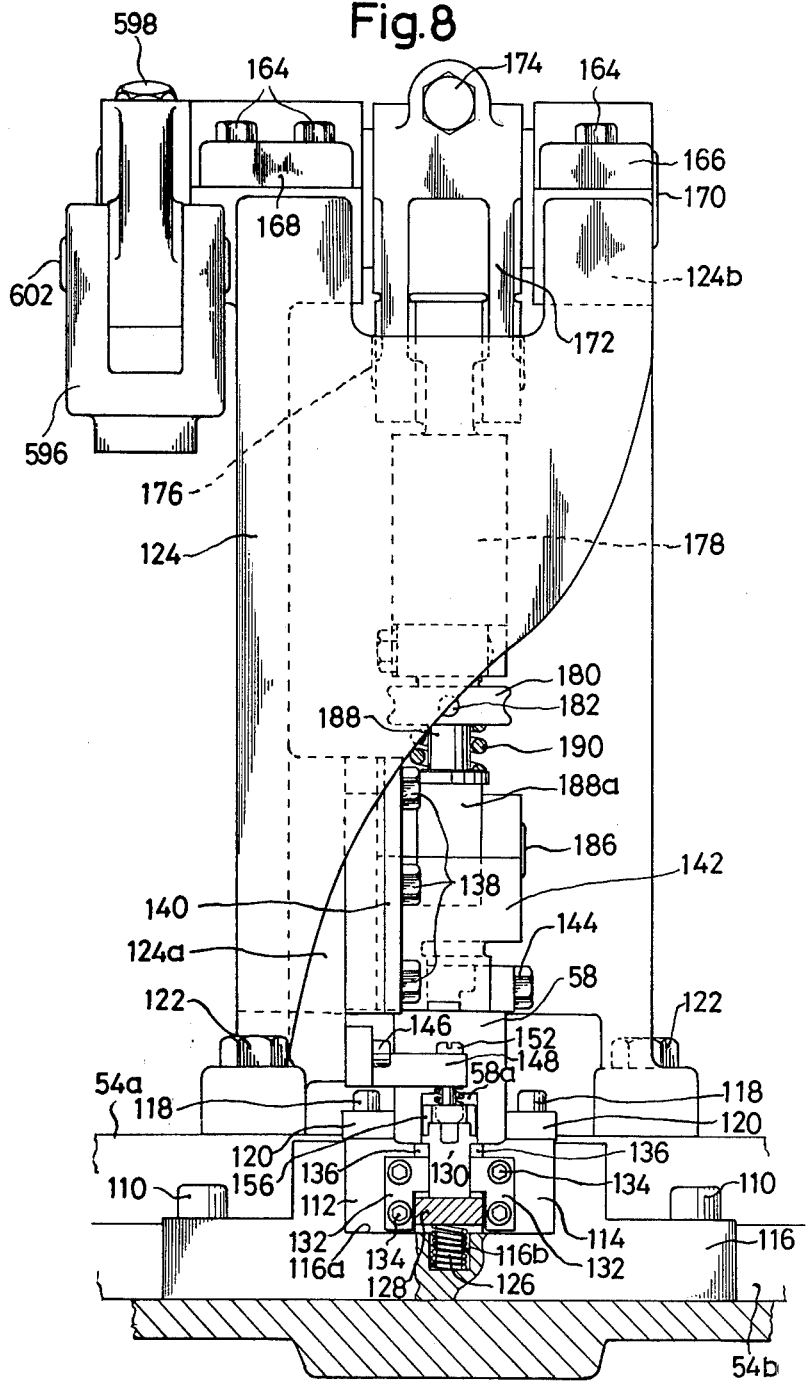

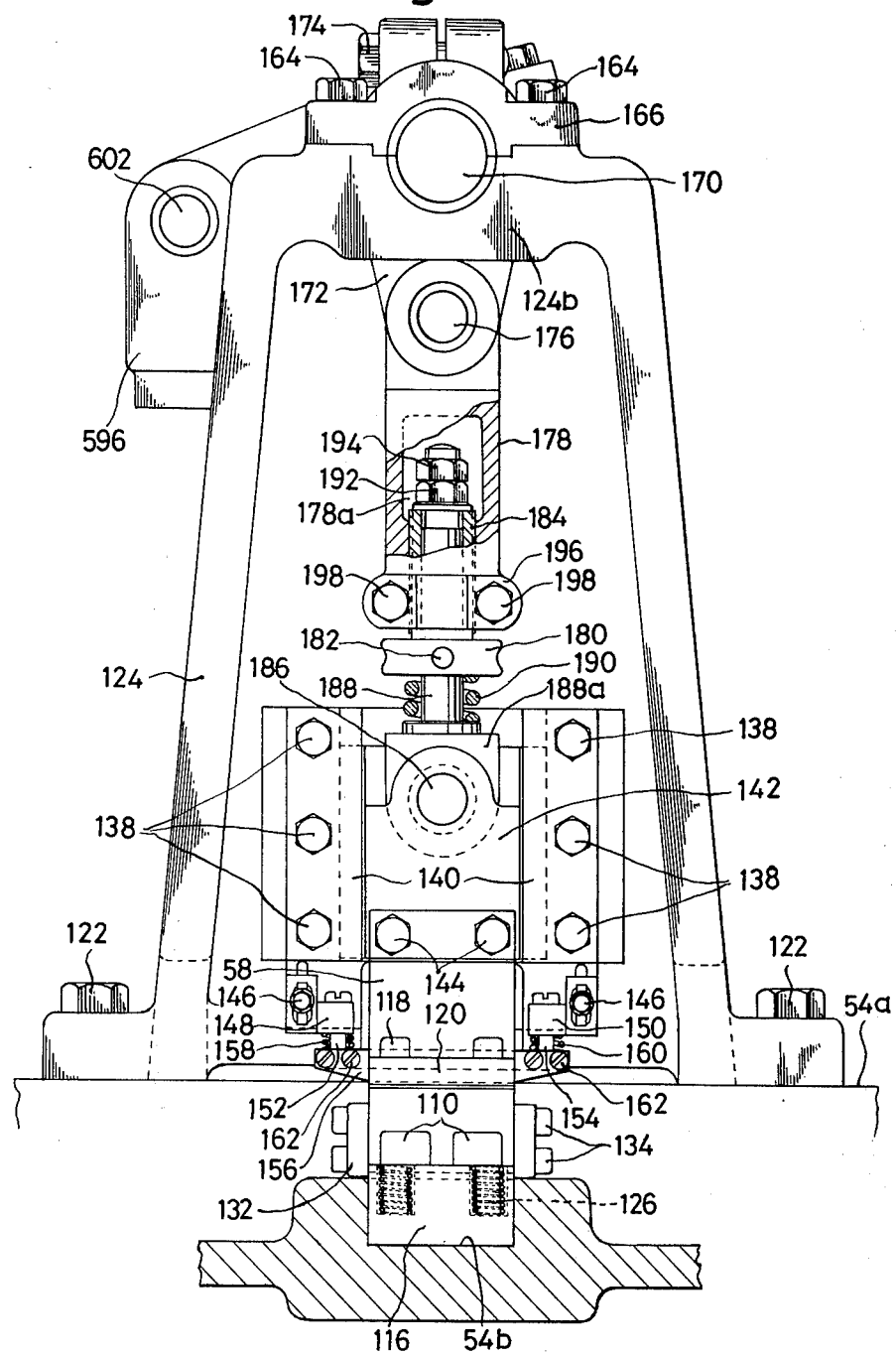

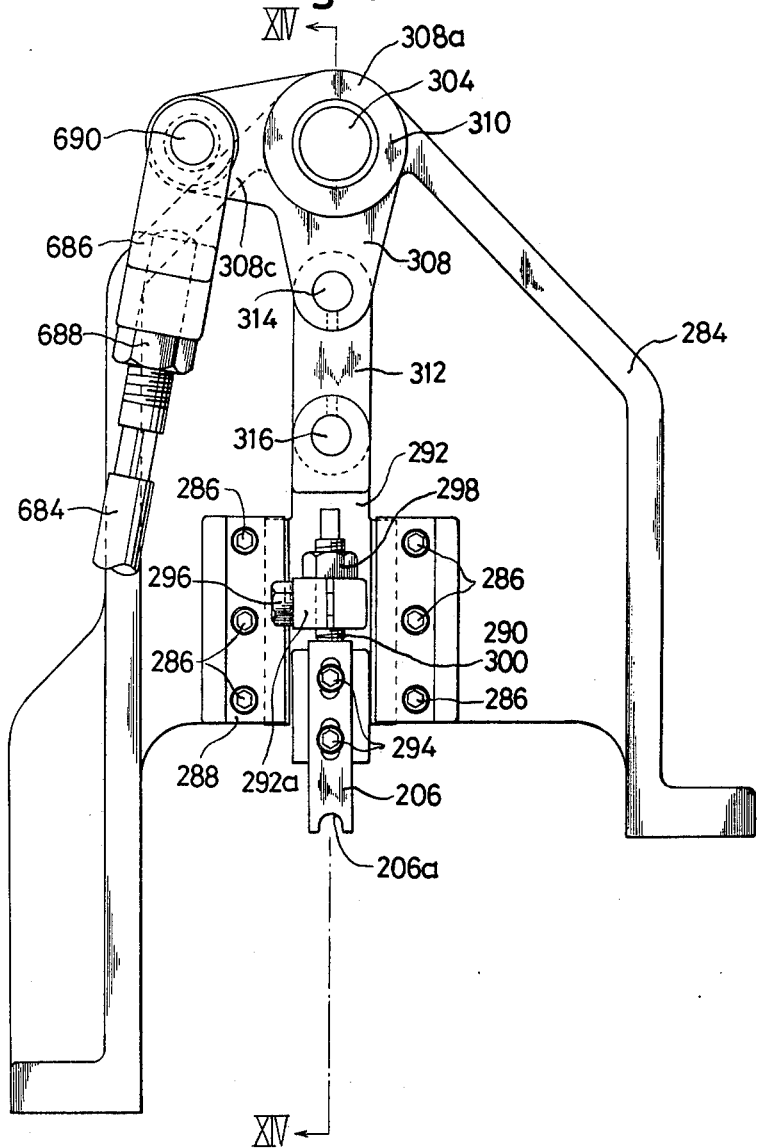

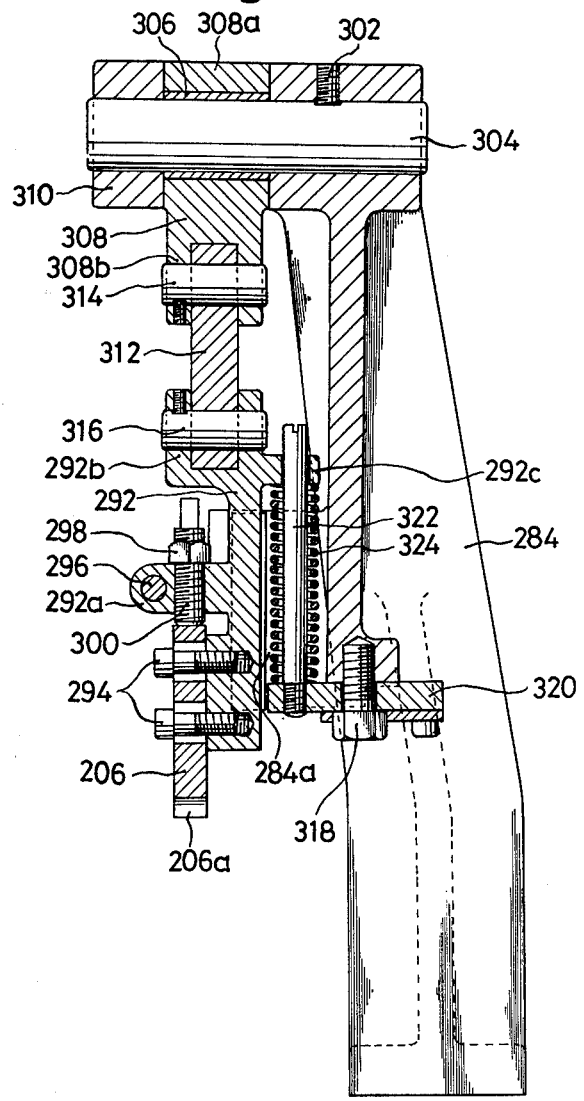

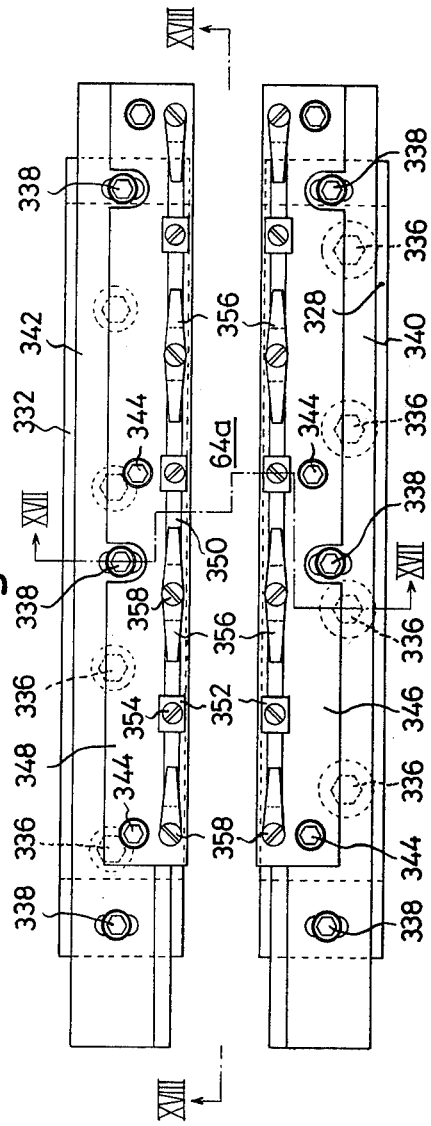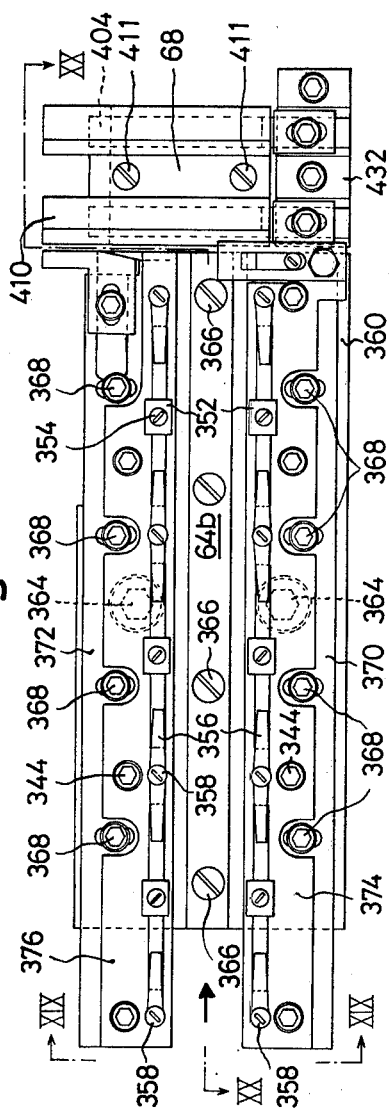

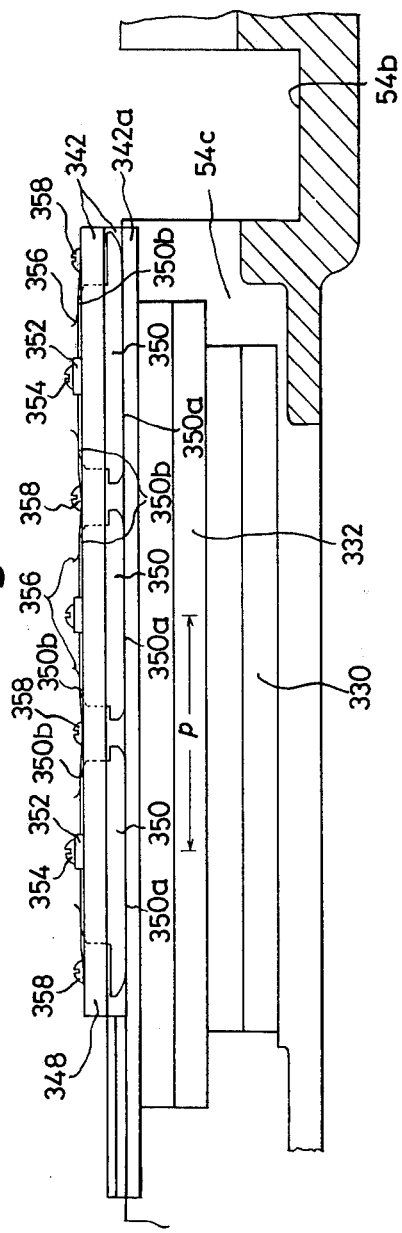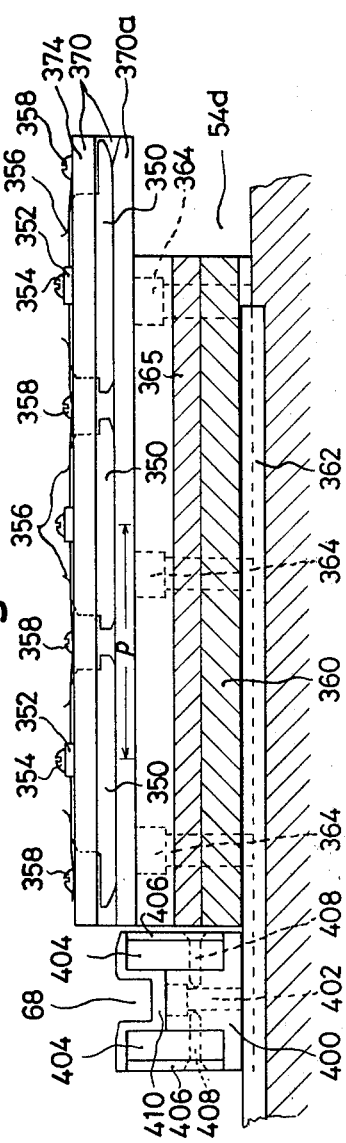

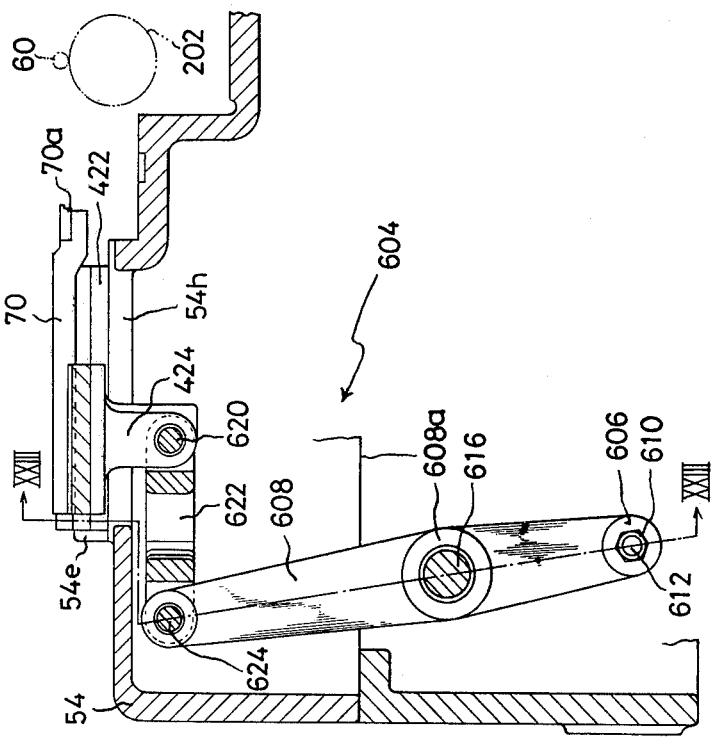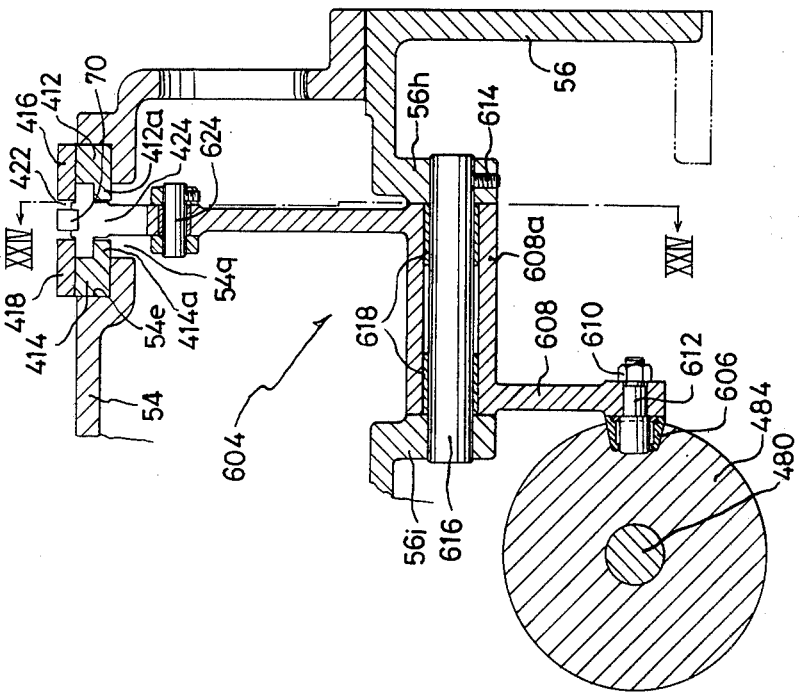

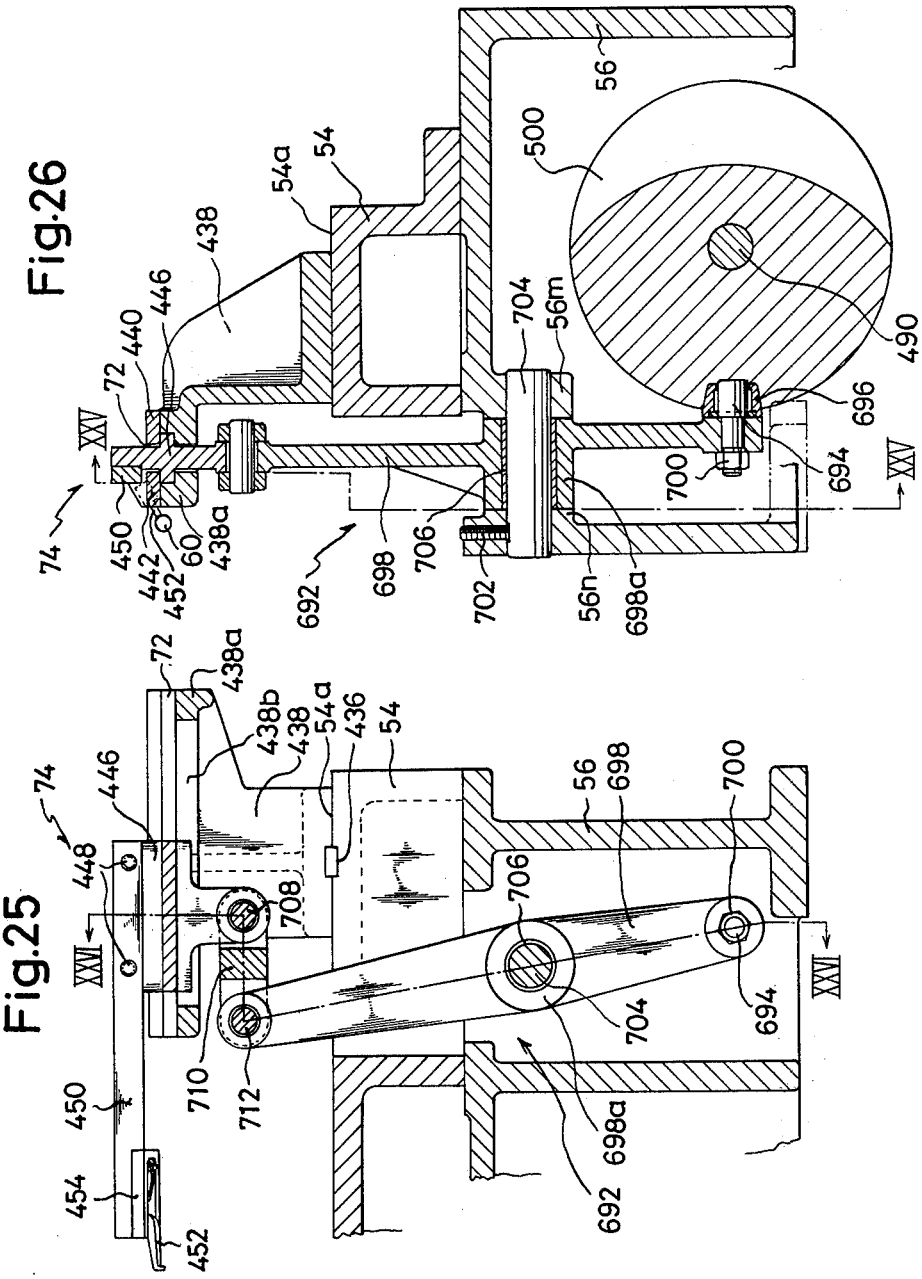

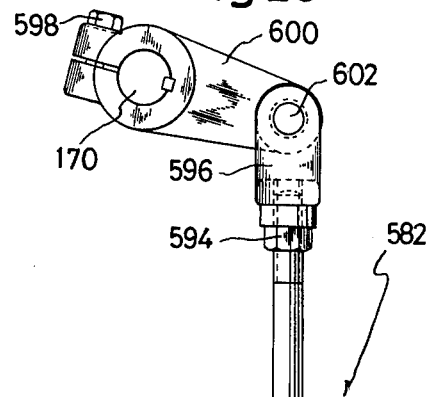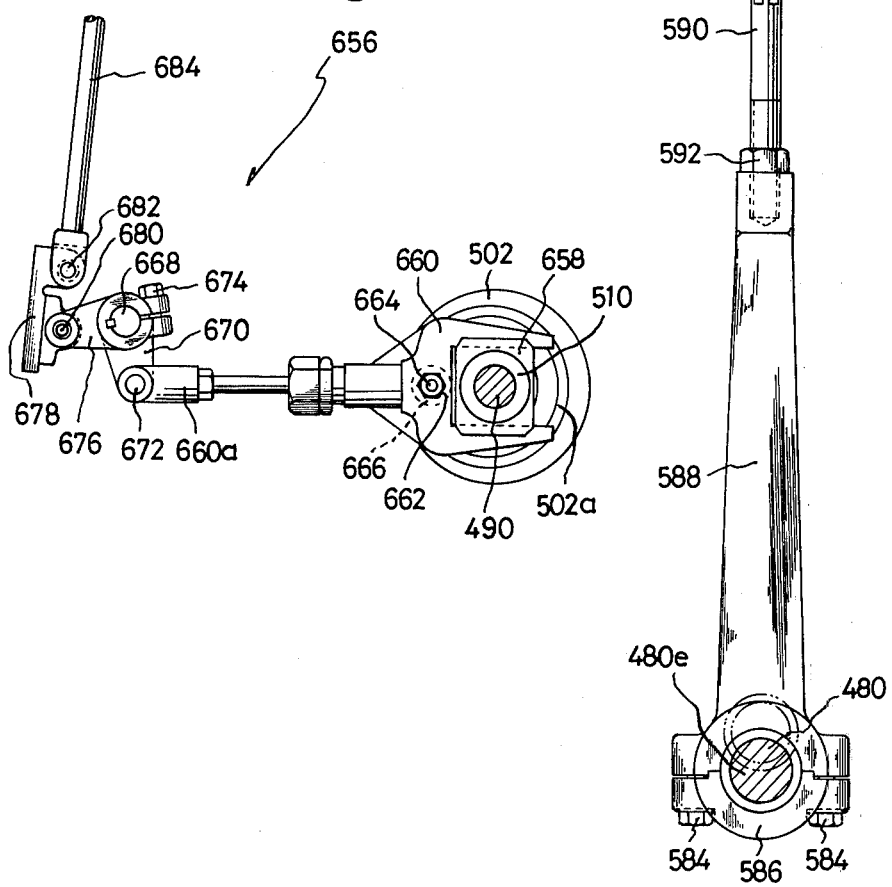

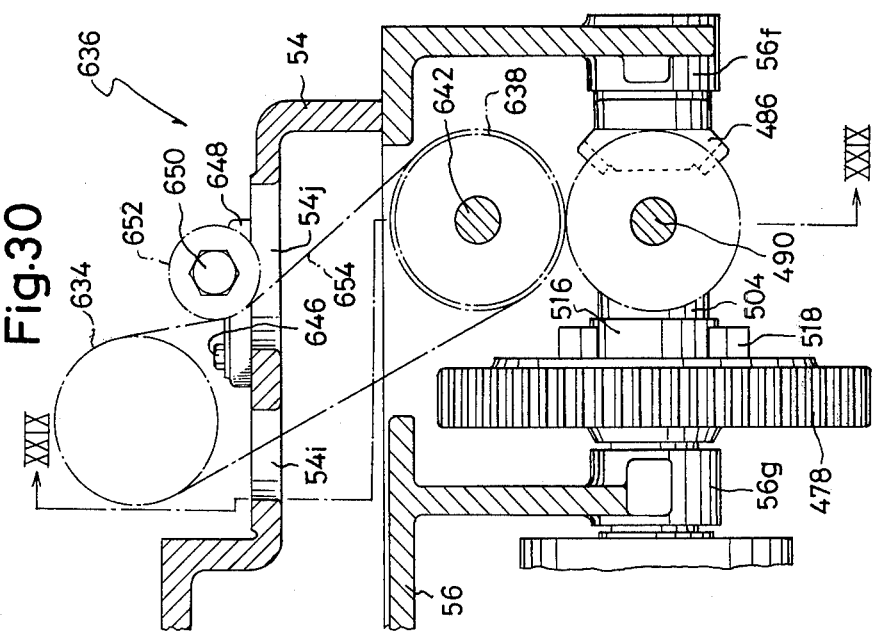
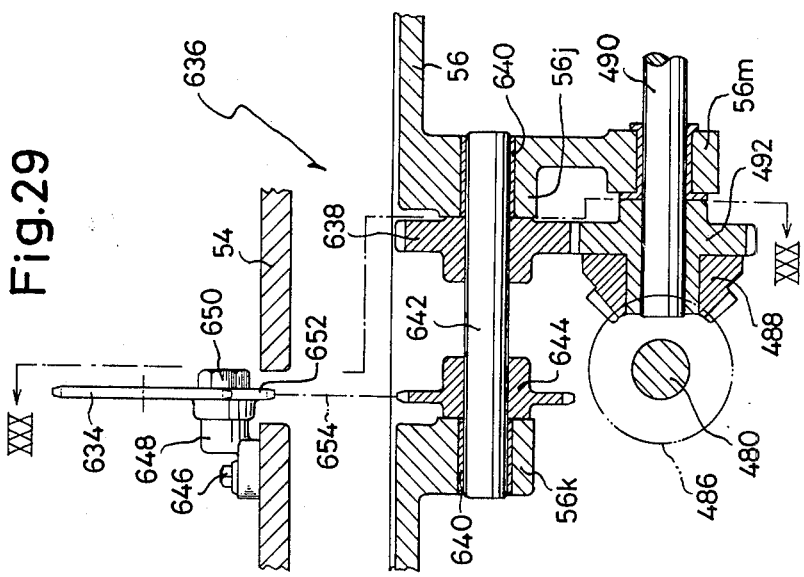

Fig.34

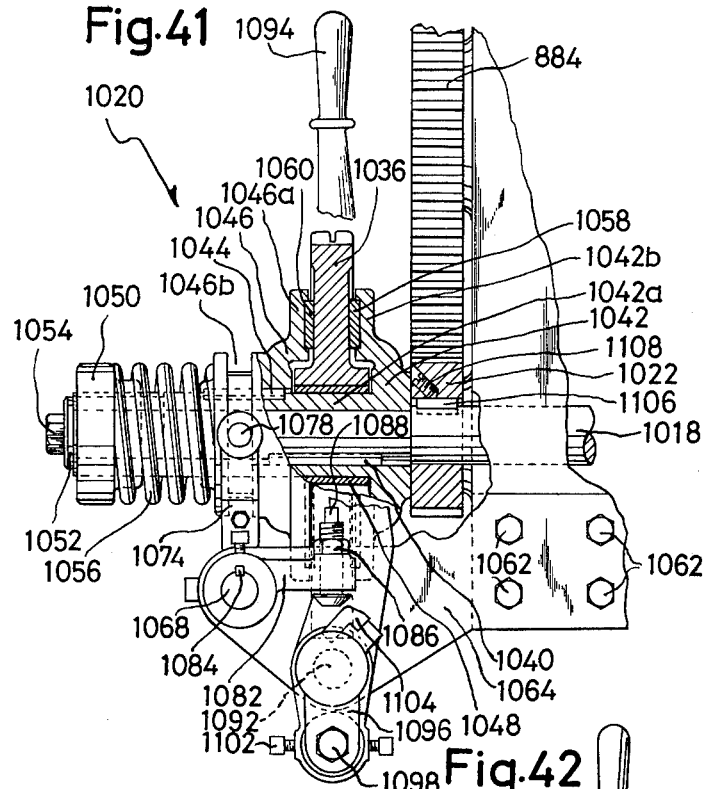
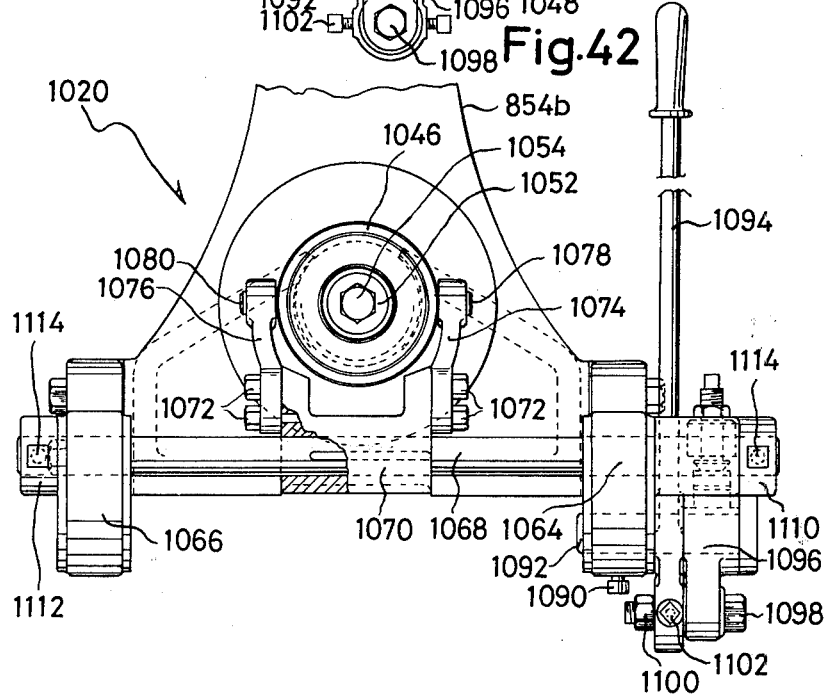

APPARATUS FOR USE IN AN AUTOMATIC AND CONTINUOUS MANUFACTURE LINE FOR MANUFACTURING THE OUTER CYLINDRICAL CASES OF DRY CELLS

The present invention relates to an apparatus for use in an automatic and continuous manufacture line for manufacturing the outer cylindrical cases of dry cells, said cylindrical cases being used for the manganese dry cells in which a carbon rod surrounded by a depolarizer consisting of mainly manganese dioxide and further surrounded by the paste of electrolyte is contained in a zinc case, which is covered by a plastic film or an insulating paper.

Each of the outer cylindrical cases of this type is formed by shearing a rectangular blank $Oa$ shown in FIG. 1 in desired shape and size from a parent blank, one face of which is printed, rolling the rectangular blank $Oa$ to a cylindrical body $Ob$ shown in FIG. 2 and then pressing both ends of the body $Ob$ in such a manner that only one end of the body $Ob$ is bent inward to form a flange $O6$ of the cylindrical case $Oc$ shown in FIG. 3.

However, the conventional forming methods were intended to roll the rectangular blank $Oa$ to a cylindrical body $Ob$ directly by a forming roll and in a single stage. As a result, the rolling rate of the areas $O3$ and $O4$ adjacent to both longer sides $O1$ and $O2$ of the rectangular blank $Oa$, which are to be faced each other after the rolling formation, was lower due to the elasticity of the blank $Oa$ and the recoil of the blank $Oa$ formed than that of the center area $O5$ of the blank $Oa$, thus causing the former areas to be almost in linear shape and making it impossible to roll the overall area $O3$, $O4$, and $O5$ of the blank $Oa$ at same rolling rate. Therefore, it resulted in that the outer cylindrical case formed was not excellent in roundness to thereby have an irregular appearance and to reduce the effective and available volume in the case, and that when some of the dry cells whose outer cylindrical cases were formed as described above were tried to be put in and out of the dry cell housing chamber provided in one of the various portable electrical devices, the portion of the dry cell at which both longer sides $O1$ and $O2$ of the blank $Oa$ were faced each other and which protruded outward irregularly was caught and dragged by the inner face of the chamber to thereby make it difficult to attain smooth putting-in and -out of the dry cells.

It is, therefore, a primary object of the present invention to provide an apparatus for use in a manufacture line for manufacturing the outer cylindrical cases of dry cells which are excellent in roundness to have a large effective and available volume in the case and of high quality.

Another object of the present invention is to provide an apparatus for use in a manufacture line for manufacturing the outer cylindrical cases of dry cells automatically and continuously.

A further object of the present invention is to provide an apparatus for use in an automatic and continuous manufacture line for manufacturing the outer cylindrical cases of dry cells and capable of enhancing mass productivity corresponding to the speed-up of production.

A still further object of the present invention is to provide an apparatus capable of making full-automatic the manufacture line for manufacturing the outer cylindrical cases of dry cells, to thereby make the production rationalized, efficient and intensive.

A still further object of the present invention is to provide an apparatus for use in a manufacture line for manufacturing the outer cylindrical cases of dry cells comprising a former for forming each of the rectangular blanks to a cylindrical body and a rotary flanger for bending one end of the cylindrical body inward to form a flange of an outer cylindrical case, said former and said flanger being combined with each other through conveyors to form a continuous manufacture line.

A still further object of the present invention is to provide an apparatus for use in an automatic and continuous manufacture line for manufacturing the outer cylindrical cases of dry cells including a former capable of attaining double-stage formation of the cylindrical body in such a manner that the rectangular blank is preformed and then further formed to a cylindrical body.

These and other objects as well as the merits of the present invention will be apparent from the following detailed description with reference to the accompanying drawings. However, the drawings are intended only for illustration and not to restrict the scope of the present invention. Therefore, all changes and modifications of the detailed parts of the apparatus provided by the present invention are included in the scope of the appended claims.

FIG. 7 is a plane view showing a stacking station provided in the former.

FIGS. 8 and 9 show a pre-forming station provided in the former, in which FIG. 8 is a back-side view, partly broken, of the station and FIG. 9 is a left-side view, partly broken, of the station.

FIGS. 10 through 12 show main portions of a forming station provided in the former, in which FIG. 10 is a plane view, partly broken, of the station, FIG. 11 a sectional view of the station taken along the line XI—XI in FIG. 10, and FIG. 12 a right-side view of the station.

FIGS. 13 and 14 show another portion of the forming station provided in the former, in which FIG. 13 is a plane view of the portion and FIG. 14 a sectional view of the portion taken along the line XIV—XIV in FIG. 13.

FIGS. 15 and 16 show a friction feed groove provided in the former, in which FIG. 15 is a plane view showing the front zone of the groove and FIG. 16 a plane view showing the back zone of the groove.

Figure 21:
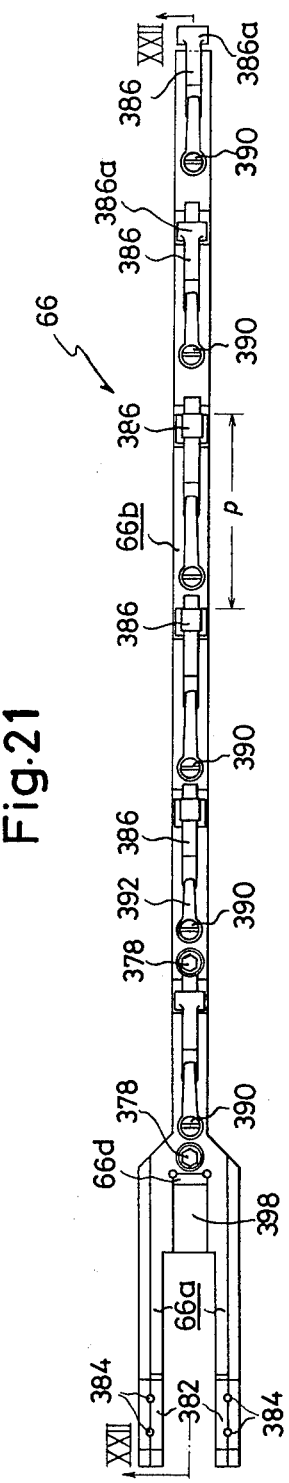
Figure 22:
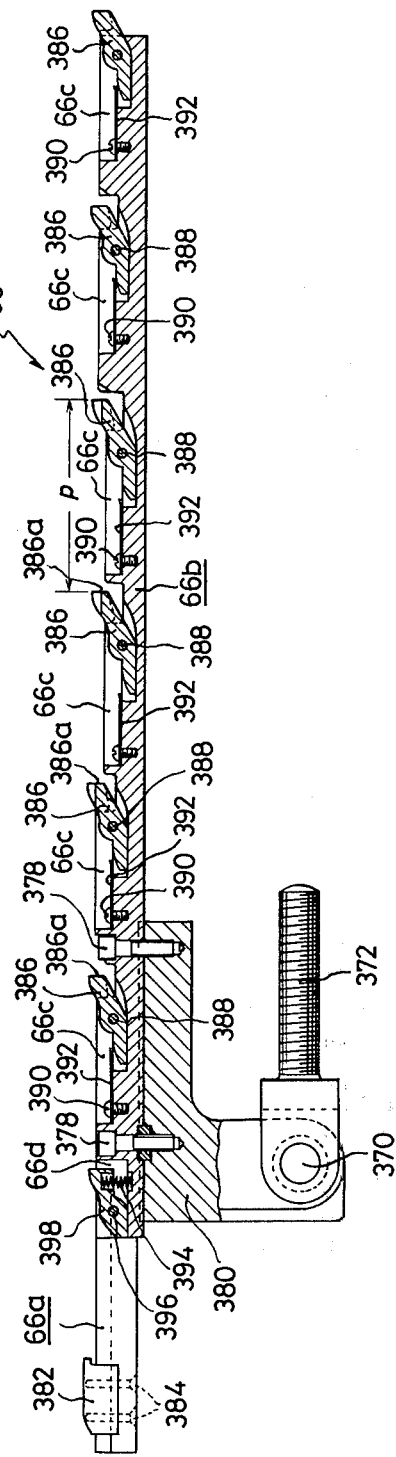

FIG. 21 is a plane view showing a carrier bar provided in the former and FIG. 22 a sectional view of the carrier bar taken along the line XXII—XXII in FIG. 21.

FIGS. 23 and 24 show a pusher driving mechanism provided in the former, in which FIG. 23 is a sectional view of the pusher driving mechanism taken along the line XXIII—XXIII in FIG. 24, and FIG. 24 a sectional view of the pusher driving mechanism taken along the line XXIV—XXIV in FIG. 23.

FIGS. 25 and 26 show an extractor driving mechanism provided in the former, in which FIG. 25 is a sectional view of the extractor driving mechanism taken along the line XXV——XXV in FIG. 26, and FIG. 26 a sectional view of the extractor driving mechanism taken along the line XXVI—XXVI in FIG. 25.

Figure 5:
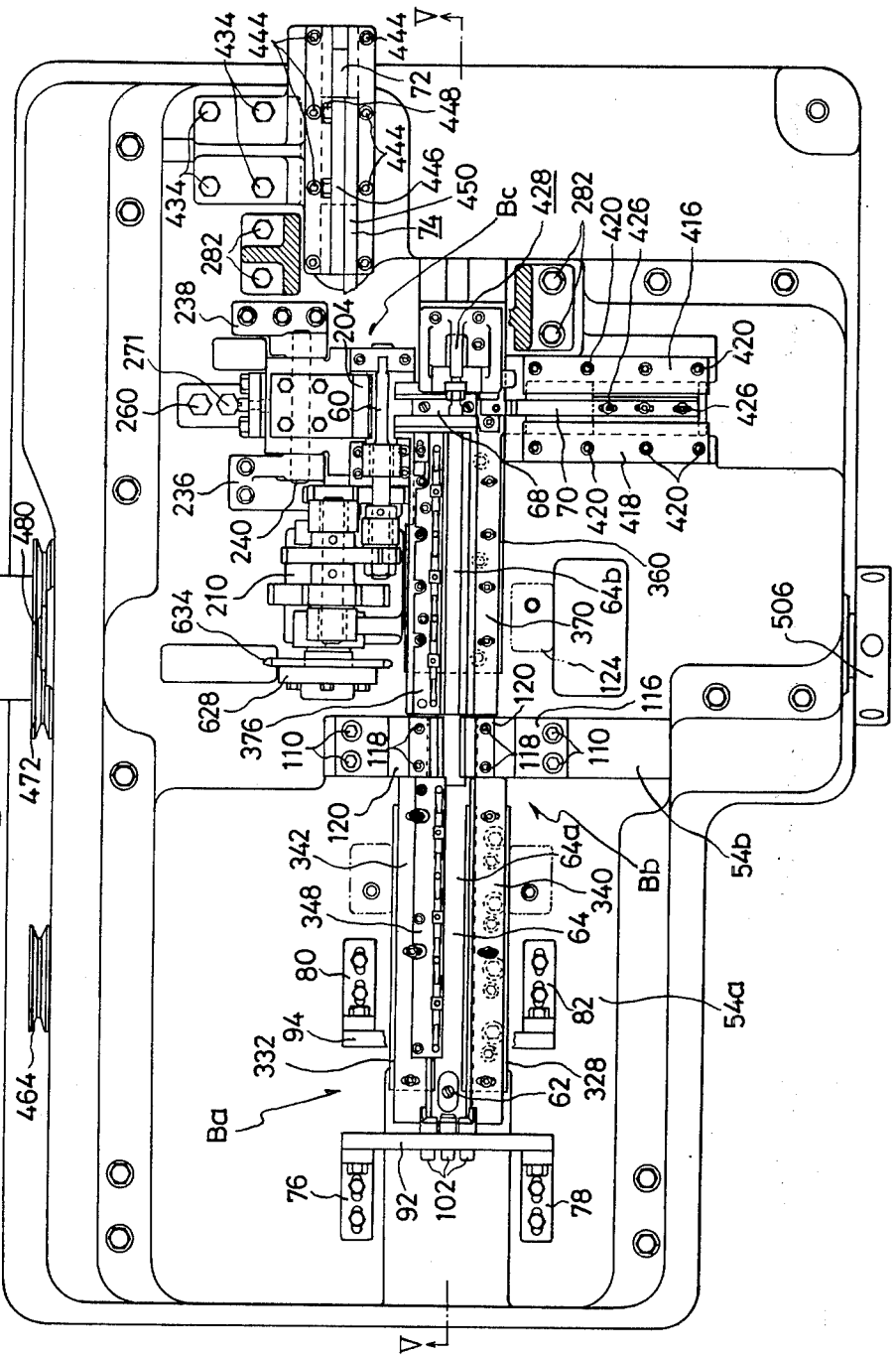
FIG. 5 is a plane view, partly broken, showing a former which is a part of an apparatus according to the present invention.
Figure 27:
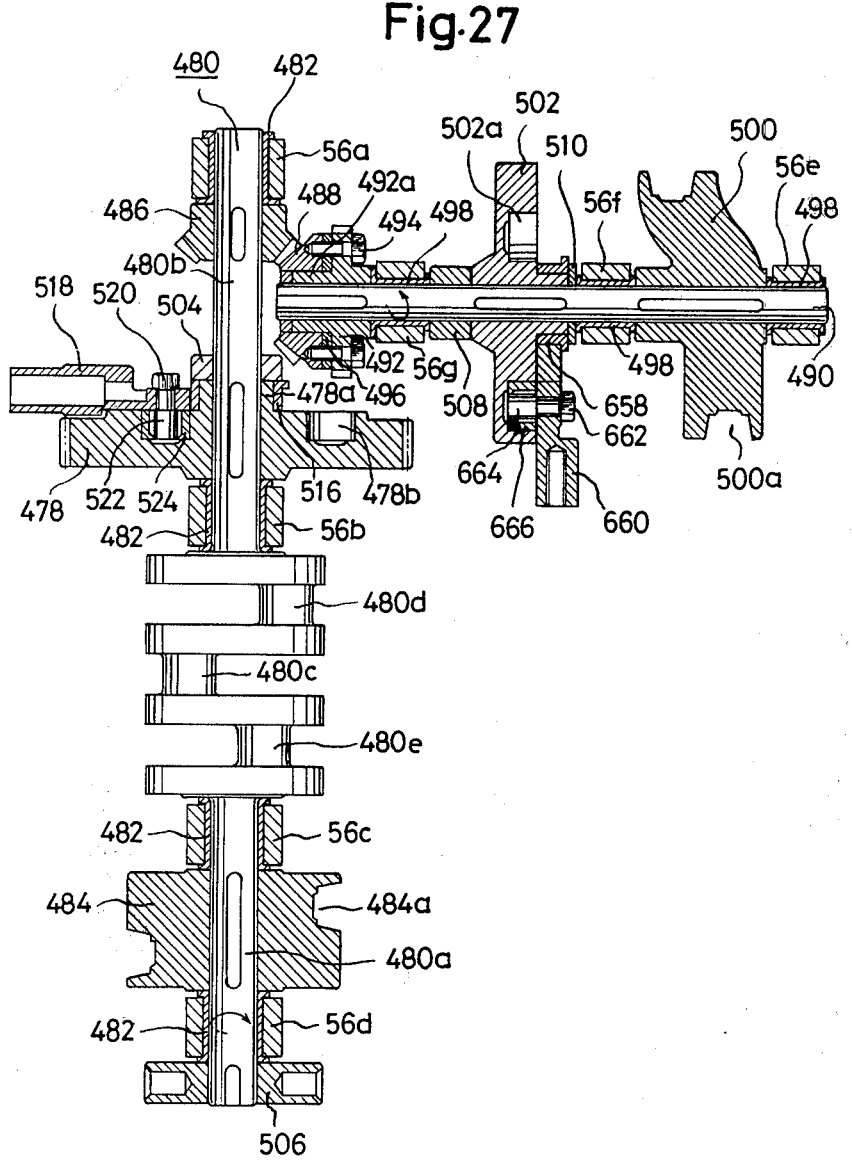

FIG. 27 is a sectional view taken along the line XXVII—XXVII in FIG. 5 and showing a main crankshaft and sub-shaft provided in the former.

FIG. 28 is a side view showing a pre-curl punch driving mechanism provided in the former.

FIGS. 29 and 30 show a roll driving mechanism provided in the former, in which FIG. 29 is a sectional view of the roll driving mechanism taken along the line XXIX—XXIX in FIG. 30, and FIG. 30 a sectional view of the roll driving mechanism taken along the line XXX—XXX in FIG. 29.

FIG. 31 is a side view showing main portions of a support finger driving mechanism provided in the former.

Figure 32:
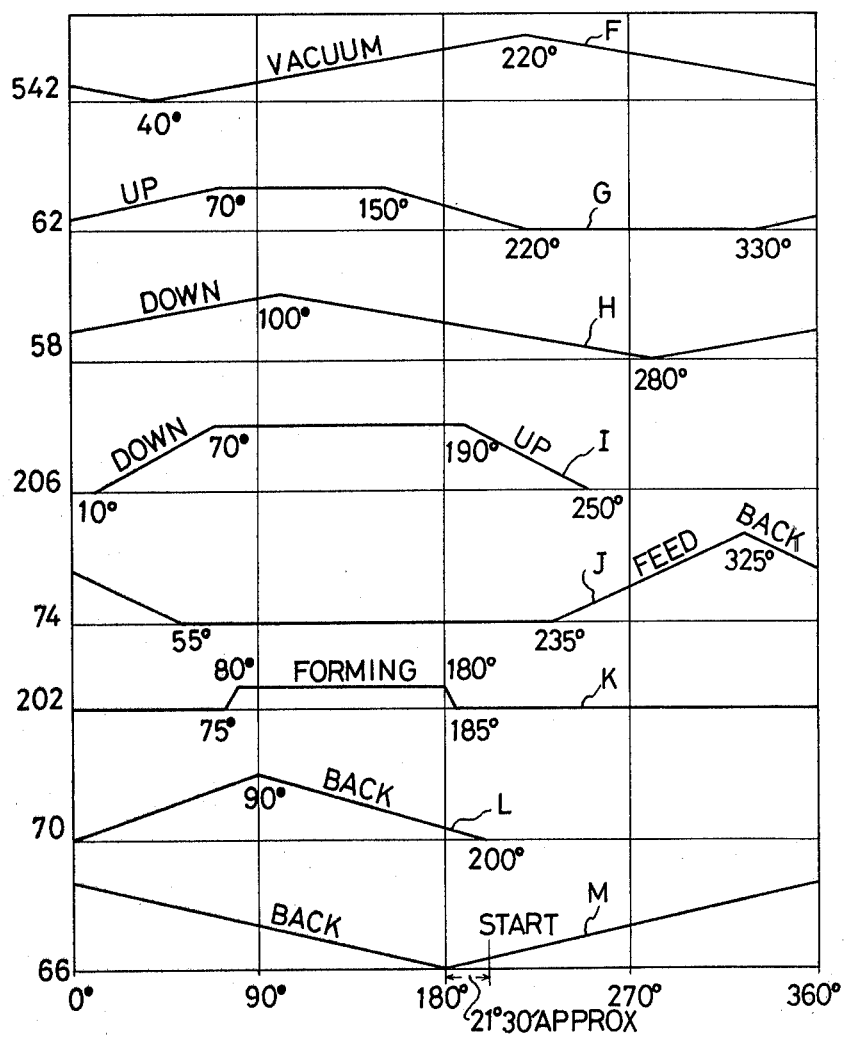

FIG. 32 is a chart showing how each of the sections in the former is timed relative to the main crankshaft and the sub-shaft.

Figure 33:
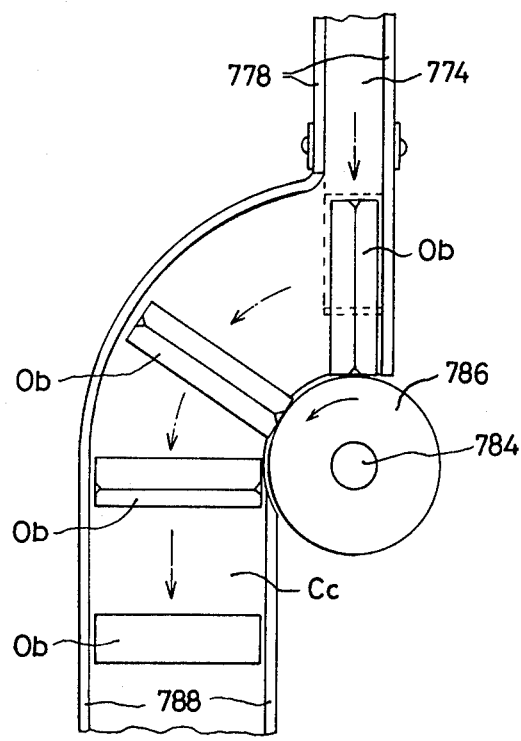

FIG. 33 is a plane view showing how the outer cylindrical body is turned at the turn chute of the conveyor.

Figure 34:
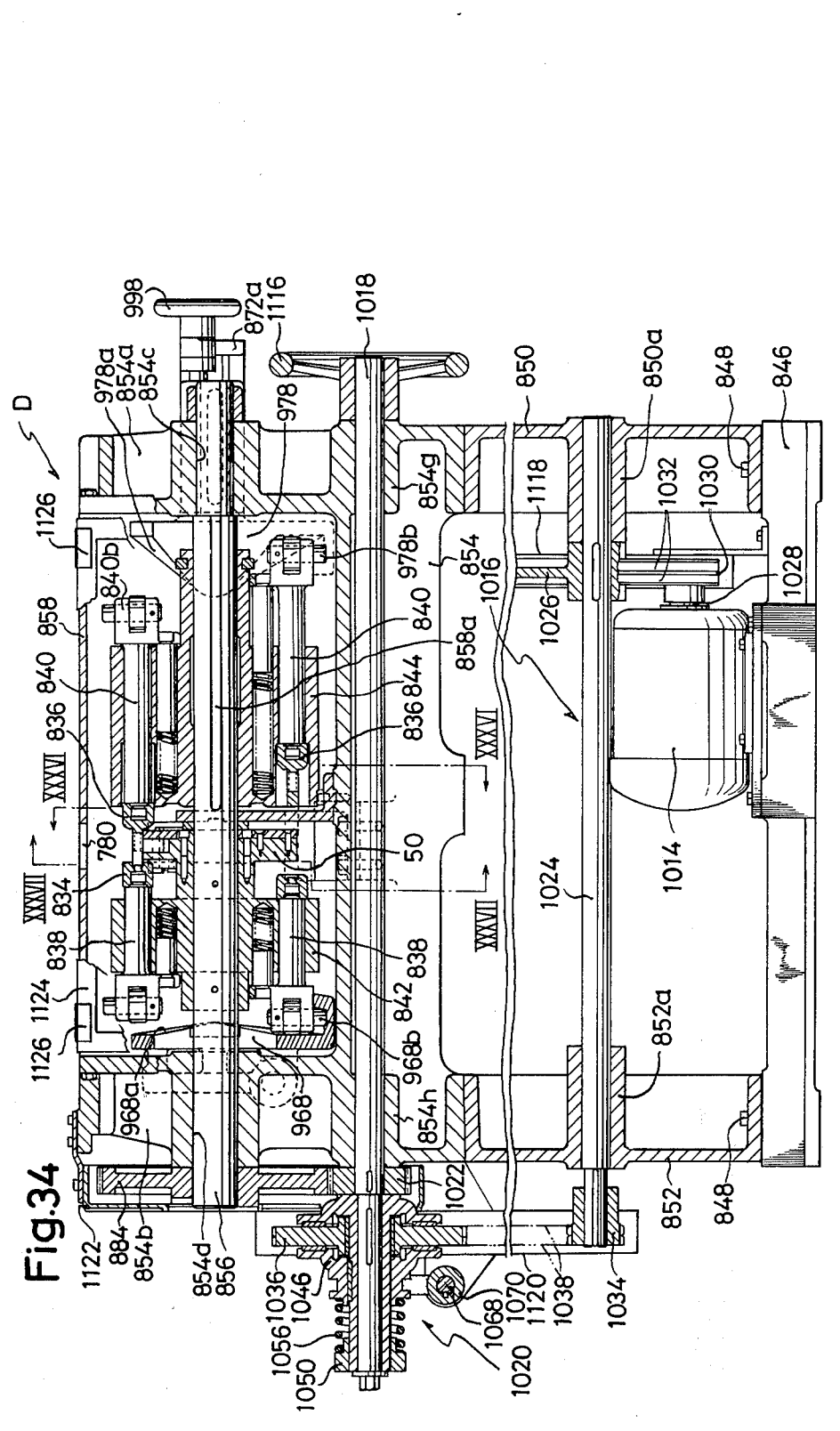

FIG. 34 is a schematic sectional view partly broken and taken along the central axis of a rotary flanger which is a part of an apparatus according to the present invention.

Figure 35:
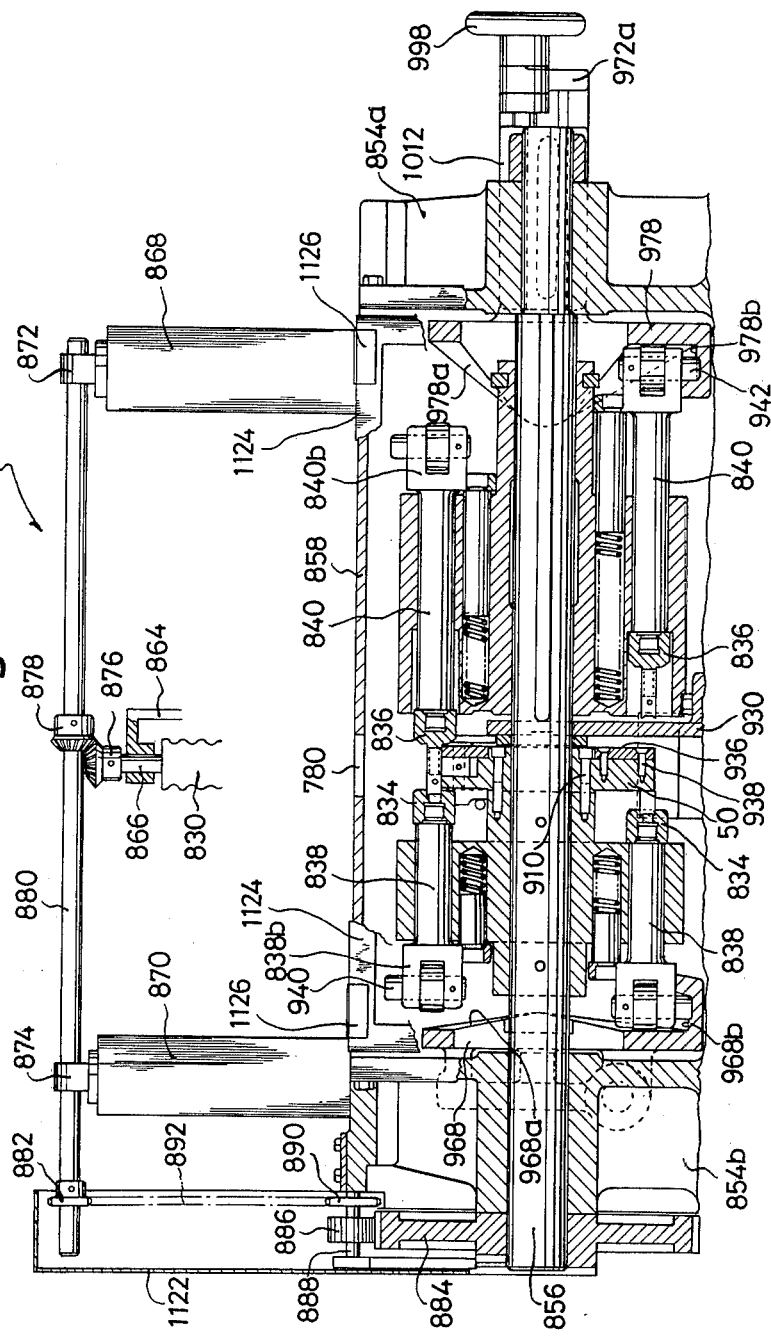

FIG. 35 is a view, partly sectioned, showing main portions of the rotary flanger and a timing screw driving mechanism.

Figure 36:
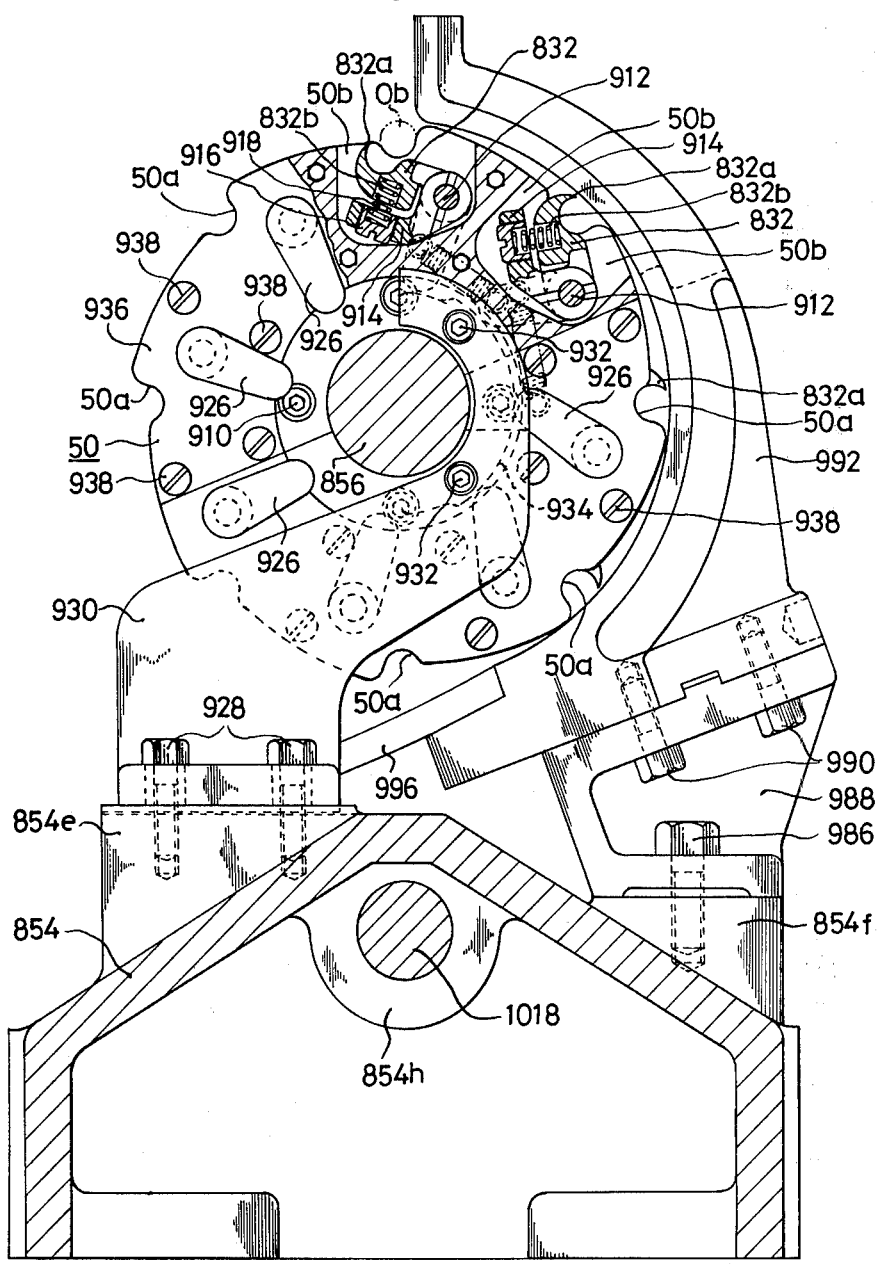
Figure 37:
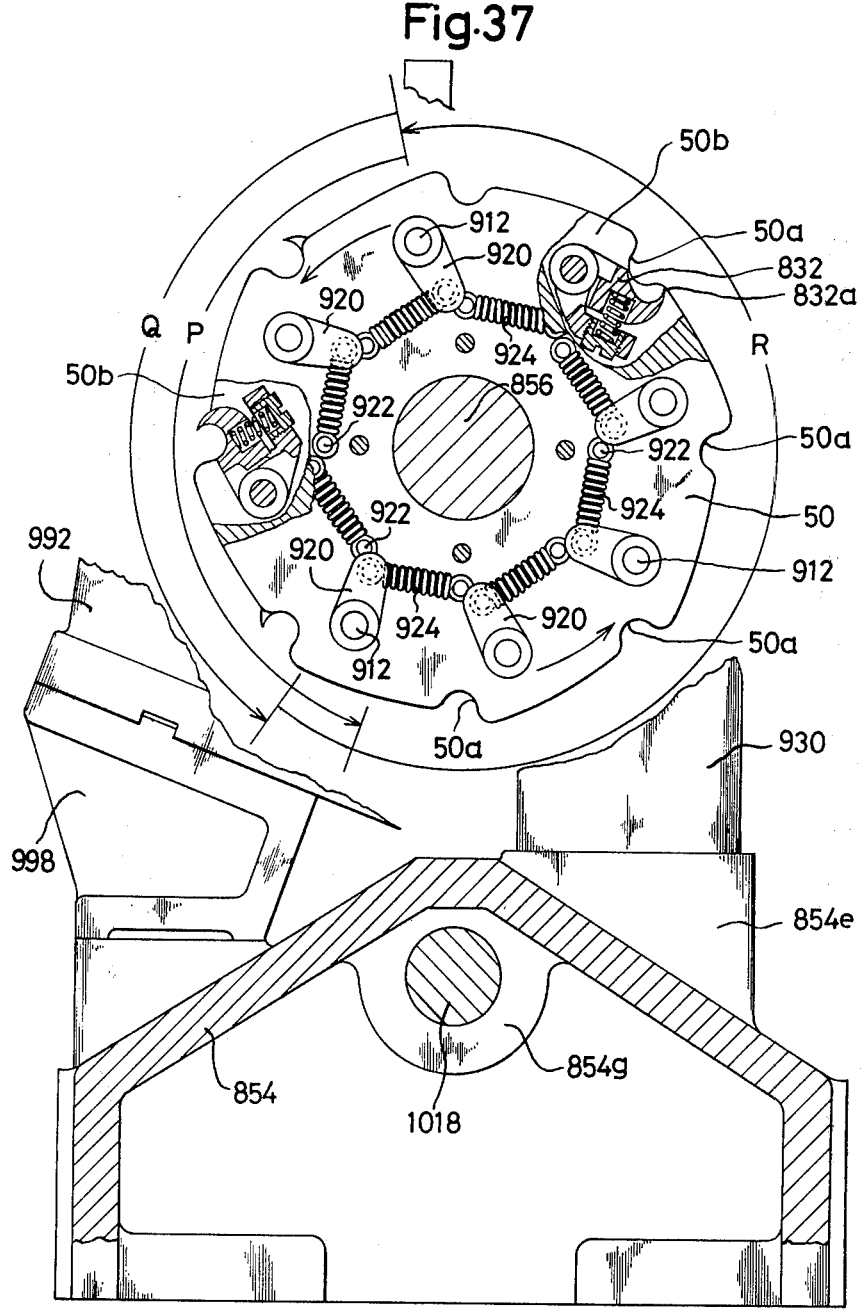

FIGS. 36 and 37 show a feed turret provided in the rotary flanger, in which FIG. 36 is a sectional view of the feed turret taken along the line XXXVI—XXXVI in FIG. 34, and FIG. 37 a sectional view of the feed turret taken along the line XXXVII—XXXVII in FIG. 34.

Figure 38:
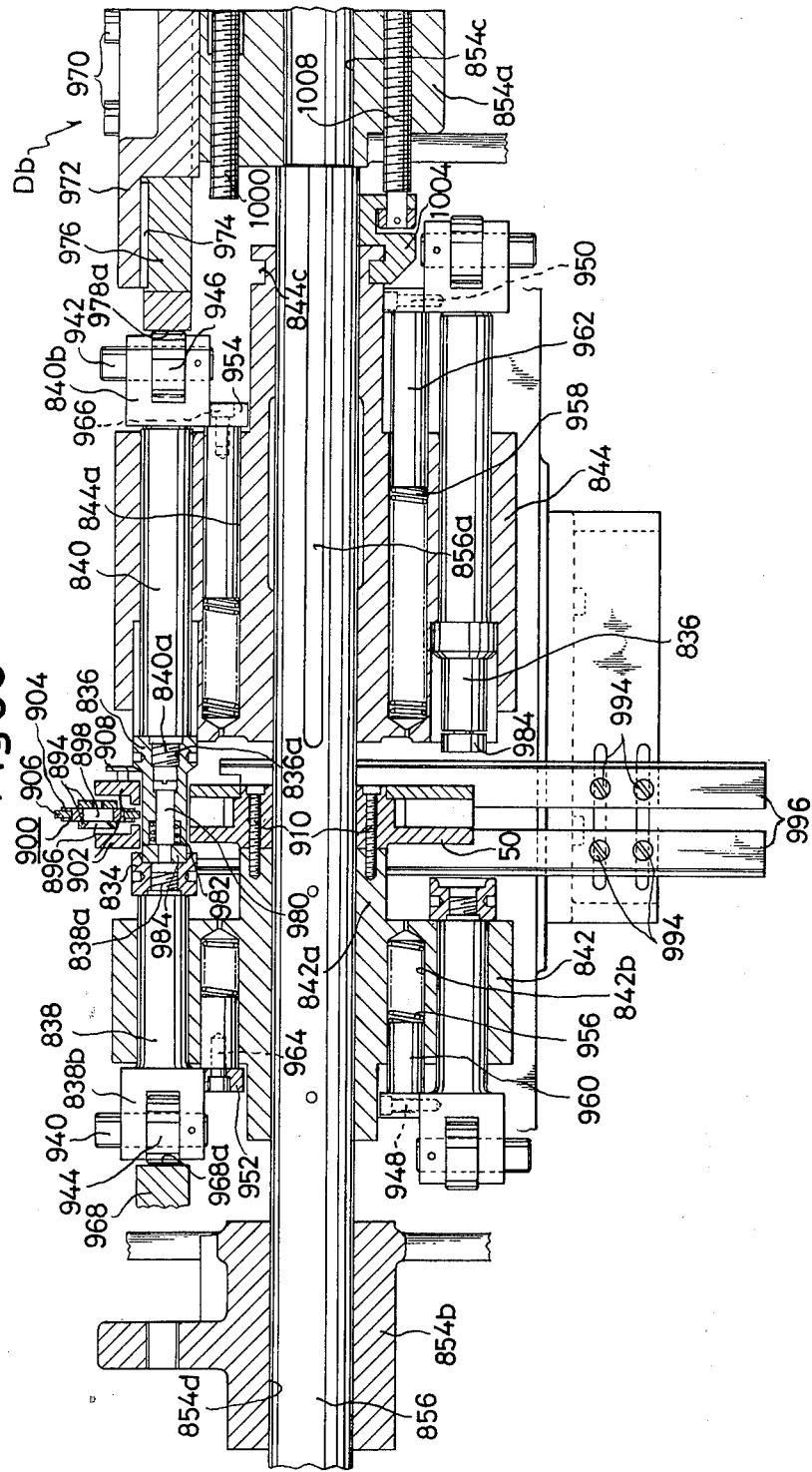

FIG. 38 is a sectional view taken along the central axis of the rotary flanger and showing main portions thereof.

Figure 39:
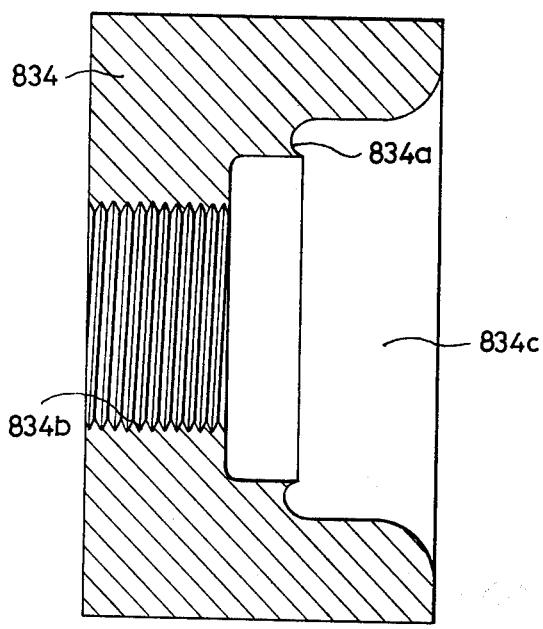

FIG. 39 is an enlarged sectional view showing the flanging disc of the rotary flanger.

Figure 40:
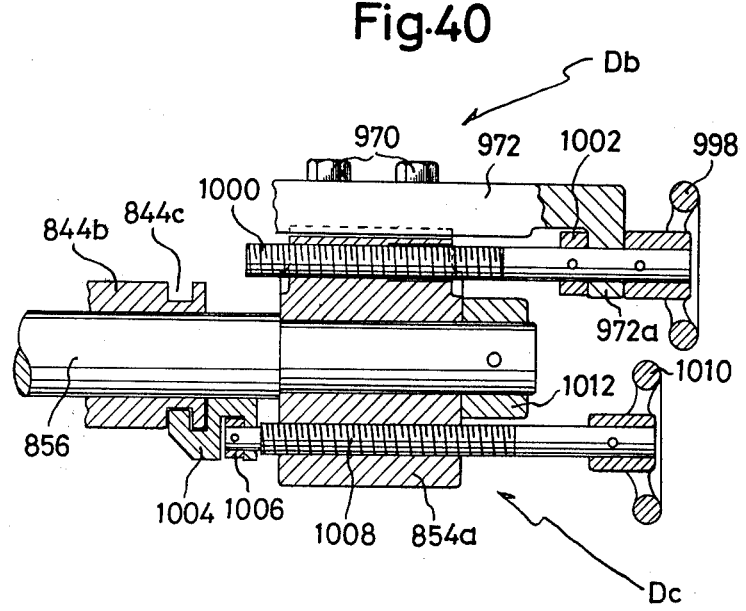

FIG. 40 is a sectional view showing mechanisms for adjusting the positions of a cam and the turret provided in the rotary flanger.

FIGS. 41 and 42 show a clutch mechanism provided in the rotary flanger, in which FIG. 41 is a front view, partly broken, of the clutch mechanism, and FIG. 42 a side view, partly broken, of the clutch mechanism.

An apparatus for use in an automatic and continuous manufacture line for manufacturing the outer cylindrical cases of dry cells according to the present invention comprises a former in which every rectangular blank shifted into the former is pre-formed by a pre-curl punch to form a desired arc and this pre-formed blank is then rolled around a forming roll to form a cylindrical body; line conveyors for feeding the cylindrical bodies discharged from the former in a horizontal direction, then in a vertical direction and then in a direction slanted downward in such a manner that the longitudinal axis of each of the bodies is always along the feeding direction, and turning each of the bodies by 90 degrees at the end of the line conveyors; and a rotary flanger for receiving each of the bodies continuously fed from the line conveyors in each of recesses provided around the outer circumference of a rotary feed turret and pressing both ends of the body in such a manner that only one end of the body is bent inward to form a flange of an outer cylindrical case.

Accordingly, the apparatus of the present invention can make full-automatic the manufacture line for manufacturing the outer cylindrical cases of dry cells in such a manner that every rectangular blank is formed to a cylindrical body and then to a cylindrical case, so that the manufacture line is made rationalized, efficient, intensive, less man-powered and speeded up with the result that mass productivity amounting to about 320 cases per minute can be attained. Further, the high ability of the apparatus can enhance the reliability and the yield rate of the cases produced greatly with low cost.

Different from the conventional forming methods, a pre-forming process is incorporated in the former to thereby make smoother the forming process subsequent to the preforming process. Therefore, every rectangular blank can be formed to have same rolling rate all over its area, thus allowing an outer cylindrical case of high quality, excellent in roundness and with a large effective and available volume inside to be obtained.

Referring to FIGS. 1 through 31, the apparatus (A) for use in an automatic and continuous manufacture line for manufacuring the outer cylindrical cases of dry cells according to the present invention comprises a former (B) in which every rectangular blank $O_a$ shifted with its underside printed is at first pre-formed to a desired arc causing the areas $O_3$ and $O_4$ adjacent to both longer sides $O_1$ and $O_2$ of the blank $O_a$ which are to be faced each other after the formation process to come close to each other with the nonprinted upper side serving as its inner face, and this preformed blank $O_a$ is then further formed to a cylindrical body $O_b$; line conveyors (C) for feeding the cylindrical bodies $O_b$ discharged from the former (B) in a horizontal direction, then in a vertical direction and then in a direction slanted downward in such a manner that the longitudinal axis of each of the bodies $O_b$ is always along the feeding direction, and turning each of the bodies $O_b$ in a direction perpendicular to the feeding direction at the end of the line conveyors; and a rotary flanger (D) for receiving each of the bodies $O_b$ continuously fed from the line conveyors (C) in each of ratch-shaped recesses 50a provided around the outer circumference of a rotary feed turret 50 and pressing both ends of the body $O_b$ in such a way that only one end of the body $O_b$ is bent inward to form a flange $O_6$ of an outer cylindrical case $O_c$.

Figure 6:
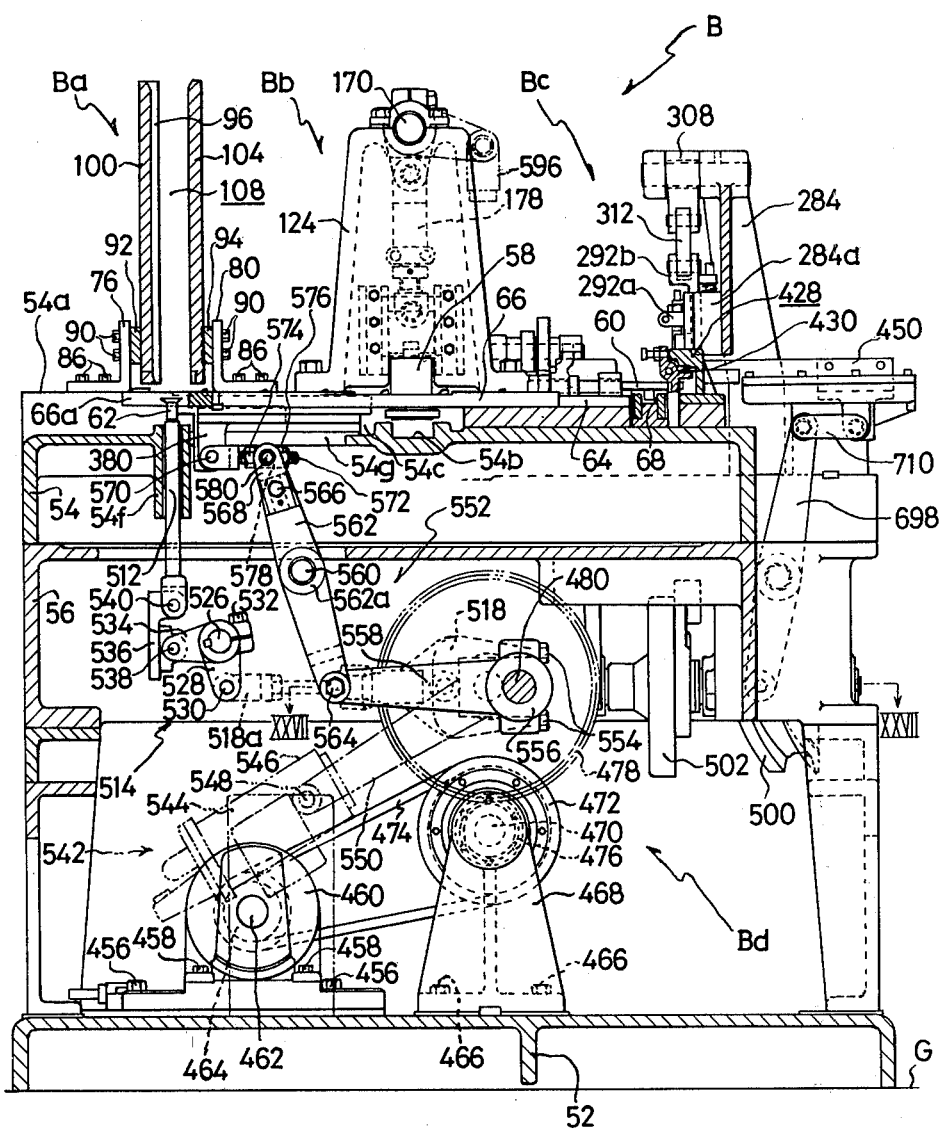
FIG. 6 is a sectional view of the former taken along the line VI—VI in FIG. 5.

As shown in FIGS. 5 and 6, the former (B) includes a stacking station (Ba), a pre-forming station (Bb) provided with a pre-curl punch 58, and a forming station (Bc) provided with a forming roll 60, these stations being respectively mounted on a table deck 54 on a frame 56 which is also mounted on a base 52 on the floor (G). The former (B) further includes a suction cup 62 capable of freely reciprocating up and down to suck up a rectangular blank every reciprocation from those stacked in the stacking station (Ba) through the bottomless underside of the station; a first carrying means or carrier bar 66 being guided and reciprocated in a friction feed groove 64 which extends on the upper face 54a of the table deck 54 from the stacking station (Ba) through the pre-forming station (Bb), and shifting the rectangular blank Oa sucked up by the suction cup 62 through the preforming station (Bb); a second carrying means or pusher 70 being guided and reciprocated in a side feed groove 68 which is provided at the end of the friction feed groove 64 and extends perpendicular to the friction feed groove 64 on the table deck 54 to come to the forming station (Bc), and pushing into the forming station (Bc) every blank Oa coming to the end of the friction feed groove 64; and an extractor 74 being guided and reciprocated in a sliding guide groove 72 which extends along the longitudinal axis of the former (B), that is, parallel to the friction feed groove 64 from near the forming station (Bc) to the end of the table deck 54, and extracting the cylindrical body Ob rolled around the forming roll 60 in the forming station (Bc).

As shown in FIGS. 6 and 7, the stacking station (Ba) comprises two pairs of L-shaped stacking brackets 76, 78 and 80, 82 fixed at the starting end of the friction feed groove 64 and to the upper face 54a of the table deck 54 by bolts 86 through washers 84 in such a way that the brackets 76 and 78 opposing each other with the groove 64 located therebetween oppose the other ones 80 and 82, respectively; support plates 92 and 94 attached to the one pair of brackets 76 and 78 and to the other pair of brackets 80 and 82, respectively, by bolts 90 through washers 88; two stacking rods 96 and 98 having cut-out portions 96a and 98a of rectangular shape for guiding both corners of one end of the rectangular blank Oa and being attached at their lower ends to the inner side of the support plate 92 by means of bolts 102 with a stacking rod 100 interposed therebetween, said rod 100 being intended to guide the center portion of one end of the rectangular blank Oa, and another stacking rod 104 fixed at its lower end to the inner side of the other support plate 94 by means of bolt 106 in a such a way that the rod 104 opposes the one 100 to guide the center portion of the other end of the rectangular blank Oa; and stoppers 100a and 104a provided to the opposing lower ends of the stacking rods 100 and 104, respectively, to temporarily support the undermost blank Oa. The stacking rods 96, 98, 100 and 104 define a stacking space 108 through which the rectangular blanks Oa lower by gravity.

As shown in FIGS. 5, 8 and 9, the pre-forming station (Bb) comprises a die holder 116 fixed by bolts 110 in a groove 54b crossing the center of the friction feed groove 64 on the upper face 54a of the table deck 54 and having in its central recess 116a forked dies 112 and 114 fixed by bolts 118 through cap blocks 120; and the pre-curl punch 58 suspended so as to freely move up and down in a punch housing 124 which is fixed by anchor bolts 122 on the table deck 54, bridging the cross section of the friction feed groove 64 and the groove 54b.

The dies 112 and 114 oppose to each other with a groove 130, through which the carrier bar 66 passes, interposed therebetween and having between their lower ends a floating plate 128 elastically supported by coil springs 126 which are housed in holes 116b provided in the recess 116a of the die holder 116, so that the carrier bar 66 passing through the groove 130 can be prevented from being overloaded at the time of the pre-curling process by the pre-curl punch 58.

In the Figures numeral 132 represents retaining plates fixed to the dies 112 and 114, respectively, through bolts 134 so as to retain both ends of plates 136 attached to the inner faces of the dies 112 and 114, respectively.

The pre-curl punch 58 is fixed through bolts 144 to the lower end of the slide 142 which is guided by parallel guides 140 to freely move up and down between the guides 140 attached through bolts 138 to a projection 124a projecting from the inner wall of the punch housing 124. The pre-curl punch 58 is provided with a recess 58a in the under side thereof, and to the undermost ends of adjusting screws 152 and 154 which vertically penetrate the foremost ends of cantilever brackets 148 and 150 attached through bolts 146 to both lower sides of the projection 124a are fixed by means of screws 162 through coil springs 158 and 160 both ends of a holder 156 which is intended to hold the rectangular blank Oa and which is fitted in the recess 58a of the pre-curl punch 58 to freely move up and down therein. On the top 124b of the punch housing 124 is rotatably attached a beam shaft 170 by means of bolts 164 through bearing caps 166 and 168, and to the beam shaft 170 is fixed through a bolt 174 the upper end of a forked rocking lever 172. Between the forked arms of the lever 172 is attached through a pin 176 the upper end of a connecting rod 178, through which an adjusting screw pipe 184 having a spring receiving flange 180 fixed through a pin 182 to the lower end thereof is screwed to come to a window 178a provided at the center portion of the connecting rod 178. A connecting screw 188 having at its lower end a pivot portion 188a connected through a pin 186 to the upper end of the slide 142 is inserted into the adjusting screw pipe 184 with a buffer coil spring 190 interposed between the pivot portion 188a and the spring receiving flange 180, and to the upper end of the connecting screw 188 exposed in the window 178a are threaded double nuts 192 and 194. Therefore, it will be understood that the rotation of the spring receiving flange 180 causes the adjusting screw pipe 184 to move up and down, thus allowing the height of bottom dead point of the pre-curl punch 58 to be adjusted.

In the Figures numeral 196 represents a metal plate attached through bolts 198 to the lower end of the connecting rod 178 and holding the adjusting screw pipe 184.

As shown in FIGS. 10 through 14, the forming station (Bc) comprises the forming roll 60 with its rolling portion 60a crossing the side feed groove 68 at the end of the groove, a feed roll 202 around a predetermined outer circumference of which a rubber plate 200 is attached to freely contact with the underside of the forming roll 60, a roll-up means 204 whose arc-shaped face 204a is opposed to the backside of the forming roll 60, and a support finger 206 which is freely moved up and down to hold the free end 60b of the forming roll 60 at the time when the pre-curled blank is further formed by the forming roll 60 to a cylindrical body Ob.

The shaft portion 60c of the forming roll 60 extending from its rolling portion 60a which has an outer circumference same as the inner circumference of the cylindrical body Ob is freely rotatably supported through roller bearings 212 and 214 housed in bearing portions 210a and 210b of a bearing bracket 210 fixed through bolts 208 on the upper face 54a of the table deck 54. A pinion 218 fixed by means of a wedge 216 to the end of the forming roll 60 passing through the bearing bracket 210 is engaged with a toothed wheel 224 fixed by means of a wedge 222 to a shaft 220 which is freely rotatably supported through bearing portions 210c and 210d of the bearing bracket 210. A toothed wheel 226 coaxially fixed by means of the wedge 222 to the shaft 220 is engaged with a toothed wheel 232 fixed by means of a wedge 230 to a driving shaft 228 which is freely rotatably supported through bearing portions 210e and 210f of the bearing bracket 210.

The protruded central portion 242a of a mounting block 242 is fixed to a shaft 240 whose both ends are supported by bearing portions 236a and 238a of bearing brackets 236 and 238, respectively, said bearing brackets 236 and 238 being attached, opposing to each other, to the upper face 54a of the table deck 54 by means of anchor bolts 234. A bearing member 246 is attached through bolts 244 to a stepped portion 242d provided in one of the forked front portions 242b and 242c of the mounting block 242, and the feed roll 202 is fixed to a roll shaft 252 whose both ends are freely rotatably supported by roller bearings 248 and 250 housed in the bearing member 246 and in the forked portion 242c, respectively.

A pinion 246 fixed by means of a wedge 254 to the end of the roll shaft 252 passing through the forked portion 242c is engaged with a pinion 258 fixed to the end of the driving shaft 228 passing through the bearing portion 210f of the bearing bracket 210. A bolt 260 threaded into the upper face 54a of the table deck 54 is penetrated through a sleeve 262 provided in the back portion 242e of the mounting block 242 in such a manner that an adjusting nut 264, a washer 266 and a coil spring 268 are interposed in this order between the bolt head of the bolt 260 and the upper face of the mounting block 242, so that the impact imparted to the feed roll 202 at the time when the pre-curled blank is formed to a cylindrical body Ob is converted to a rotation force rotating anti-clockwise with the shaft 240 functioning as its center, to thereby be absorbed by the coil spring 268 and to keep the feed roll 202 unloaded. Further, an adjusting bolt 271 having an adjusting nut 270 threaded thereto is screwed through the back portion 242e of the mounting block 242 in front of the other bolt 260 in such a manner that the lowermost end of the bolt 271 is brought in contact with the upper face 54a of the table deck 54, so that the degree at which the back portion 242e of the mounting block 242 is pressed down by the elasticity of the coil spring 268 can be freely determined to control the degree at which the rubber plate 200 attached to the feed roll 202 is contacted with the forming roll 60.

The roll-up means 204 is mounted through a wedge block 272 on the slanted upper face 242f of the protruded portion 242a of the mounting block 242 by means of bolts 273. The wedge block 272 can freely slide on the slanted upper face 242f of the mounting block 242 with its projection stripe 272a extending on the underside thereof being fitted into the guide recess stripe 242g of the slanted upper face 242f, while the roll-up means 204 can also freely slide on the wedge block 272 with its guide recess stripe 204b provided in the underside thereof being fitted onto the projection stripe 272b provided, extending, on the upper face of the wedge 272. At the back side of the protruded portion 242a of the mounting block 242a of the mounting block 242 is erected a bracket 276 through bolts 274, which is connected to the back ends of the roll-up means 204 and the wedge block 272 through adjusting screws 278 and 280. Therefore, the positions of the roll-up means 204 and the wedge block 272 can be freely controlled by the adjusting screws 278 and 280.

As shown in FIG. 5 and FIGS. 13 and 14, the support finger 206 has a cut-out portion 206a of arc shape provided at the lowermost end thereof, said cut-out portion 206a being intended to engage with the free end 60b of the forming roll 60. A pair of restricting plates 288 and 290 is attached through bolts 286, parallel to each other, to the front ends of parallel rib guides 284a projected from the inner wall of a stand bracket 284 which is mounted through anchor bolts 282 on the upper face 54a of the table deck 54. A slide 292 is guided to freely reciprocate up and down between the parallel rib guide 284a. To the front face of the lower end of the slide 292 is attached through bolts 294 the upper portion of the support finger 206 so as to freely be adjusted in up- and down-direction, and the top of the support finger 206 is pressed by the bottom end of a screw 300 which is inserted into a projection 292a projected frontward from the central portion of the slide 292 and fastened by a bolt 296, and to the top of which is threaded a nut 298. On to a fixing shaft 304 whose one end is inserted through the upper end of the stand bracket 284 and fixed by means of a lock screw 302 is freely rotatably fitted the central cylindrical portion 308a of a swingable lever 308 through a bearing metal 306 provided around the inner circumference of the portion 308a, and onto the free end of the shaft 304 is further fitted a stop ring 310. Between the lower forked ends 308b of the lever 308 is inserted and connected by means of a pin 314 the upper end of a connecting rod 312, whose lower end is inserted between the upper forked ends 292b of the slide 292 and connected thereto by means of a pin 316. A support plate 320 whose one end projects between the lower back ends of the parallel rib guides 284a is attached through a bolt 318 to the stand bracket 284, and a spring pin rod 322 whose lower end is screwed into the support plate 320 erects vertically between the parallel rib guides 284a to be freely slidably inserted at its upper end through the ring-shaped portion 292c projected backward from the back side of the upper portion of the slide 292 with a coil spring 324 inserted therebetween. Therefore, the press impact of the slide 292 can be reduced and the quick upward return of the slide 292 can be attained, thus enabling the press operation of the finger 206 relative to the free end 60b of the forming roll 60 to be smoothed and the cylindrical body Ob rolled up by the forming roll 60 to be extracted by the extractor 74 without fail.

As shown in FIGS. 15 through 20, the friction feed groove 64 consists of a front zone 64a and a back zone 64b with the pre-forming station (Bb) interposed therebetween, wherein the front zone 64a comprises a pair of upper and lower base metal plates 326, 328 and 330, 332, said upper and lower base metal plates 326 and 328 being arranged in one side 54c of the groove provided in the upper face 54a of the table deck 54 to be symmetrical to those 330 and 332 arranged in the other side 54c of the groove and having projections 326a and 328a opposed to those 330a and 332a of the plates 330 and 332 in which the lower plates 326 and 330 are fixed through anchor bolts 334 to the bottom flanges 54c' of both sides 54c of the groove, respectively, and the upper plates 328 and 332 are fixed through fixing bolts 336 to the lower plates 326 and 330, respectively; a pair of guide plates 340 and 342 being mounted through fixing bolts 338 on the upper plates 328 and 332, respectively; and a pair of banker plates 346 and 348 being mounted through fixing bolts 344 on the guide plates 340 and 342, respectively.

There are provided in the banker plates 346 and 348, respectively, holes 346a and holes 348a having same interval (p) in the longitudinal direction, and into each of the holes is fitted a bite member 350 in such a manner that it can slide upward with its lower end 350a supported by the flange 340a or 342a of the guide plate 340 or 342 and with its upper end exposed a little from the banker plate and attached thereto through a washer 352 and a screw 354, said guide plates 340 and 342 being intended to guide both sides of the rectangular blank Oa and said members 350 being intended to catch the blank Oa between the opposing ones and to stop the return of the blank Oa. A plate spring 356 is attached between the adjacent bite members 350 to the banker plate 346 or 348 through a screw 358 with its both or one end(s) mounted on the shoulders 350b of the bite members 350 to elastically press the lower end 350a of the bite member 350 against the flange 340a or 342a of the guide plate 340 or 342. Therefore, each of the rectangular blanks Oa shift-fed between the bite members 350 arranged in the banker plates 346 and 348 and by the carrier bar 66 is caught of its both sides between the lower end 350a of the bite member 350 and the flange 340a of the guide plate 340 and between the lower end 350a of the other opposing bite member 350 and the flange 342a of the guide plate 342, thus preventing the rectangular blank Oa from following the carrier bar 66 at the time when the bar returns back.

The back zone 64b of the friction feed groove 64 comprises a recessed base plate 360 fitted through a key 362 and anchor bolts 364 into the recess 54d; a guide trough 365 fitted through bolts 366 into the recessed base plate 360; a pair of guide plates 370 and 372 being mounted through bolts 368 on both sides of the recessed base plate 360 and having flanges 370a and 372a opposing each other; banker plates 374 and 376 same as those provided in the front zone 64a being mounted on the guide plates 370 and 372; and other members same as those provided in the front zone 64a and represented by same numerals.

As shown in FIGS. 21 and 22, the carrier bar 66 arranged in the friction feed groove 64 to freely reciprocate therein is forked at the starting end thereof to form a forked portion 66a, through which the suction cup 62 passes in the up- and down-direction. The underside of the bar 66 adjacent to the forked portion 66a thereof is fixed through bolts 378 to a fallen "L" holder 380. Ratchet blocks 382 fixed by means of screws 384 on the starting ends of the forked portions 66a, respectively, serve to catch and push the back end of the rectangular blank Oa mounted on the forked portions 66a by the suction cup 62 so as to cause both sides of the blank Oa to be caught between the bottom ends 350a of the first opposing bite members 350 and the flanges 340a, 342a of the guide plates 340, 342. A shift ratchet 386 is arranged in each of ratchet holes 66c provided in the bar portion 66b of the carrier bar 66 and pinned through a pin 388 thereto so as to attain lever-like movement therein. The back end of the ratchet 386 is elastically pressed by a plate spring 392 whose one end is fixed through a screw 390 to the bar 66. As apparent from the above, when the carrier bar 66 is forwarded in the friction feed groove 64, the front end 386a of the shift ratchet 386 is projected a little from the ratchet hole 66c at same pitch interval (p) to catch and push the back end of the rectangular blank Oa whose both sides have been already caught between the bottom ends 350a of the preceding opposing bite members 350 and the flanges 340a, 342a of the guide plates 340, 342 or the flanges 370a, 372a of the guide plates 370, 372 due to the elasticity of the plate spring 356 so as to cause both sides of the blank Oa to be next caught between the bottom ends 350a of the subsequent opposing bite members 350 and the flanges 340a, 342a of the guide plates 340, 342 or the flanges 370a, 372a of the guide plates 370, 372 against the elasticity of the plate spring 356 and to continuously shift-feed a blank every pitch. When the carrier bar 66 returns back, the front end 386a of the shift ratchet 386 is housed in the ratchet hole 66c against the elasticity of the plate spring 392 and caused to return back contacting with the underside of the blank Oa whose both sides are caught and held between the bottom ends 350a of the opposing bite members 350 and the flanges 340a, 342a of the guide plates 340, 342 due to the elasticity of the plate spring 356. In the Figures numeral 394 represents a coil spring for lifting the front end of a shift ratchet 398 arranged in a ratchet hole 66d and pinned through a pin 396 thereto so as to attain lever-like movement therein.

As shown in FIGS. 16 and 20, the side feed groove 68 comprises a base 400 having a section of reversed T-shape and being fixed through an anchor bolt 402 on the upper face 54a of the table deck 54; main and auxiliary plates 404 and 406 attached through screws 408 to both sides of the base 400, respectively; and a trough 410 mounted between the main plates 404 and fixed through screws 411 on the base 400. As shown in FIGS. 5, 23 and 24, a recess 54e is provided extending in the left- and right-ward direction of the table deck 54 and along the side feed groove 68, and on both side bottoms 54e' of the recess 54e are mounted a pair of seat plates 412 and 414 which have projections 412a and 414a, respectively, opposing to each other and on which are further mounted a pair of restricting plates 416 and 418. The seat plates 412 and 414 on which are mounted the plates 416 and 418, respectively, are fixed through fixing bolts 420 on the table deck 54 to form a guide recess 422, by which is guided and reciprocated a slider 424 of T-shaped section, on which is fixed through bolts 426 the back portion of the pusher 70. To the foremost end of the pusher 70 is welded a pushing claw 70a for engaging with the side end of the blank Oa.

In FIGS. 5 and 6 numeral 428 represents a stopper mechanism arranged opposing to the end of the friction feed groove 64 with the side feed groove 68 interposed therebetween, said stopper mechanism serving to stop on the side feed groove 68 each of the blanks Oa shift-fed through the friction feed groove 64 by the carrier bar 66 and to determine the position of each of the blanks Oa and having a buffer spring 430. In FIG. 16 numeral 432 denotes a recess by which the pusher 70 is guided.

As shown in FIGS. 5, 25 and 26, the extractor 74 comprises a guide bracket 438 fixed through anchor bolts 434 and a key 436 on the upper face 54a of the table deck 54; an extractor guide recess 72 provided in and along the portion 438a horizontally projected from the top of the guide bracket 438; a pair of restricting plates 440 and 442 mounted through bolts 444 on both sides of the recess 72, respectively; a slider 446 of cross section fitted in the recess 72 so as to freely reciprocate therealong; a rod 450 whose back portion is fixed through bolts 448 to one upper side of the slider 446; and a hook 452 attached through a holder 454 to the underside of the front end of the rod 450, said hook 452 serving to hook the back end rim of the cylindrical body Ob rolled up around the forming roll 60 and to extract the cylindrical body Ob from the forming roll 60.

There will now be described a driving system (Bd) for synchronously controlling the up- and down-ward movement of the suction cup 62, the backward and forward reciprocation of the carrier bar 66, the up- and down-ward movement of the pre-curl punch 58, the right- and left-ward reciprocation of the pusher 70, the rotations of the forming roll 60 and the feed roll 202, the up- and down-ward movement of the support finger 206, and the backward and forward reciprocation of the extractor 74, respectively.

As shown in FIG. 6, the driving system (Bd) of the former (B) includes a motor 460 fixed through bolts 458 and anchor bolts 456 on the base 52 in the frame 56, a pulley 464 fixed to the motor shaft 462, another pulley 472 fixed to one end of a transmission shaft 470 which is freely rotatably supported by a bearing brackey 468 fixed through anchor bolts 466 on the base 52 in the frame 56, an endless belt 474 stretched between the pulleys 464 and 472, a toothed wheel 476 fixed to the transmission shaft 470, and another toothed wheel 478 engaged with the toothed wheel 476 and fixed to a main crank shaft 480. Therefore, the driving torque generated by the motor 460 is transmitted to the crank shaft 480.

As shown in FIG. 27, the main crank shaft 480 is rotatably inserted through the bearing sleeves 482 of bearing portions 56a, 56b, 56c and 56d projected from the inner wall of the frame 56, and a recessed cam 484 is attached to the straight portion 480a of the main shaft 480 and between the bearing portions 56c and 56d. A bevel gear 486 is attached to the other straight portion 480b of the main shaft 480 and adjacent to the bearing portion 56a, engaging with another bevel gear 488 which is fitted through bolts 494 and a spacer 496 onto the boss portion 492a of a transmission toothed wheel 492 fixed to the inner end of a sub-shaft 490. The sub-shaft 490 is rotatably inserted through the bearing sleeves 498 of bearing portions 56e, 56f and 56g projected from the inner wall of the frame 56, having a recessed cam 500 between the bearing portions 56e and 56f, and a recessed cam 502 between the bearing portions 56f and 56g. The cam 484 is used for the side feed, the one 500 for the extractor 74, and the one 502 for the support finger 206. In the Figure numerals 504, 506 and 508 represent stop rings, and numeral 510 a spacer collar.

As shown in FIGS. 6 and 27, a mechanism 514 for transmitting the action of the toothed wheel 478 fixed to the main crank shaft 480 to the lowermost end of a push-up rod 512 penetrated through a guide sleeve 54f of the table deck 54, said push-up rod 512 having at the top thereof the suction cup 62 which is located right under the stacking station (Ba) and between the forked portion 66a of the carrier bar 66, comprises a forked member 518 between which is freely rotatably caught a sleeve 516 fitted onto the boss portion 478a of the toothed wheel 478, a cam follower 524 having a stud 522 attached through a nut 520 to the side of the forked member 518 and engaged with a cam recess 478b provided in the face of the toothed wheel 478 opposing the side of the forked member 518, a lever 528 one end of which is connected through a pin 530 to the back end 518a of the forked member 518 and the other end of which is fixed to a shaft 526, and a lever 534 one end of which is fixed through a fastening bolt 532 to the shaft 526 and the other end of which is connected through a pin 538 to the side end of a connection member 536, whose top is pinned through a pin 540 to the lowermost end of the push-up rod 512. One rotation of the toothed wheel 478 is caused to correspond to a stroke of the up- and down-ward movement of the suction cup 62.

As shown in FIGS. 6 and 27, a vacuum pump mechanism 542 for applying vacuum suction force to the suction cup 62 when the cup 62 is in its top dead position comprises brackets 544 mounted on the base 52 in the frame 56, a cylinder 546 attached between the brackets 544 in a slanted fashion relative to the base 52, a piston rod 550 whose one end is connected through a pin 548 to a piston (not shown) freely slidable in the cylinder 546 and whose other end is attached to a second crank pin 480c of the main crank shaft 480, and an air pipe (not shown) for connecting the back end of the cylinder 546 to the suction cup 62, so that the piston rod 550 is caused to attain a stroke of its backward and forward reciprocation every rotation of the main crank shaft 480, with the result that the suction process of the suction cup 62 is started at the time when the cup 62 is contacted at its top dead position with the rectangular blank Oa located at the lowermost end of the stacking station (Ba).

A carrier bar driving mechanism 552 interposed between the lower end of the reversed "L" holder 380 having the carrier bar 66 fixed on the top thereof and passing through a bottom hole 54g of the recess 54c provided in the table deck 54, and a first crank pin 480d of the main crank shaft 480, comprises a lever 558 freely rotatably attached at the one end thereof through bolts 554 and a bearing cap 556 to the first crank pin 480d, another lever 562 whose central cylindrical portion 562a is freely rotatably fitted onto a shaft 560 and whose one end is attached to the other end of the lever 558 by means of a bolt pin 564, a connection member 568 attached through a bolt 556 to the other end of the lever 562, a threaded connection rod 572 pinned through a pin 570 to the lowermost end of the reversed "L" holder 380, and a block 578 attached through a pin 580 to the threaded connection rod 572 and caught between nuts 574 and 576. The carrier bar 66 is caused to attain a stroke of its backward and forward reciprocation every rotation of the main crank shaft 480.

As shown in FIGS. 27 and 28, a pre-curl punch driving mechanism 582 interposed between the beam shaft 170 for causing the pre-curl punch 58 to be moved up and down and a third crank pin 480e of the main crank shaft 480 includes a rod 588 attached, freely idling, at the lower end thereof to the third crank pin 480e by means of bolts 584 and a bearing cap 586, a tie-rod 590 whose lower end is screwed into the upper end of the rod 588 through a nut 592, a connection member 596 into which the upper end of the tie-rod 590 is screwed through a nut 594, and a swingable arm 600 one end of which is fastened to the beam shaft 170 by means of a bolt 598 and the other end of which is attached through a pin 602 to the connection member 596. The pre-curl punch driving mechanism 582 causes the pre-curl punch 58 to attain a stroke of its up- and down-ward movement every rotation of the main crank shaft 480.

As shown in FIGS. 23, 24 and 27, a pusher driving mechanism 604 for transmitting the action of the recessed cam 484 fixed to the main crank shaft 480 to the lower end of the slider 424 of T-shaped section having the pusher 70 mounted thereon and passing through a bottom hole 54h of the recess 54e provided in the table deck 54 includes a cam follower 606 engaged with a cam recess 484a provided around the outer circumference of the cam 484, a lever-like rod 608 having two arms one of which has the cam follower 606 freely rotatably attached through a nut 610 and a stud 612 to the lower end thereof, a shaft 616 both ends of which are supported by bearing portions 56h and 56i, respectively, and fixed thereto by a screw 614, the central cylindrical portion 608a of the rod 608 being freely rotatably fitted onto the shaft 616 through bearing metals 618 and between the bearing portions 56h and 56i which are projected from the inner wall of the frame 56 opposing to each other, and a link 622 whose one end is attached through a pin 624 to the other arm of the rod 608 and whose other end is attached through a pin 620 to the lower end of the slider 424. The pusher driving mechanism 604 causes the pusher 70 to achieve a stroke of its right- and left-ward reciprocation every rotation of the recessed cam 484.

Figure 10:
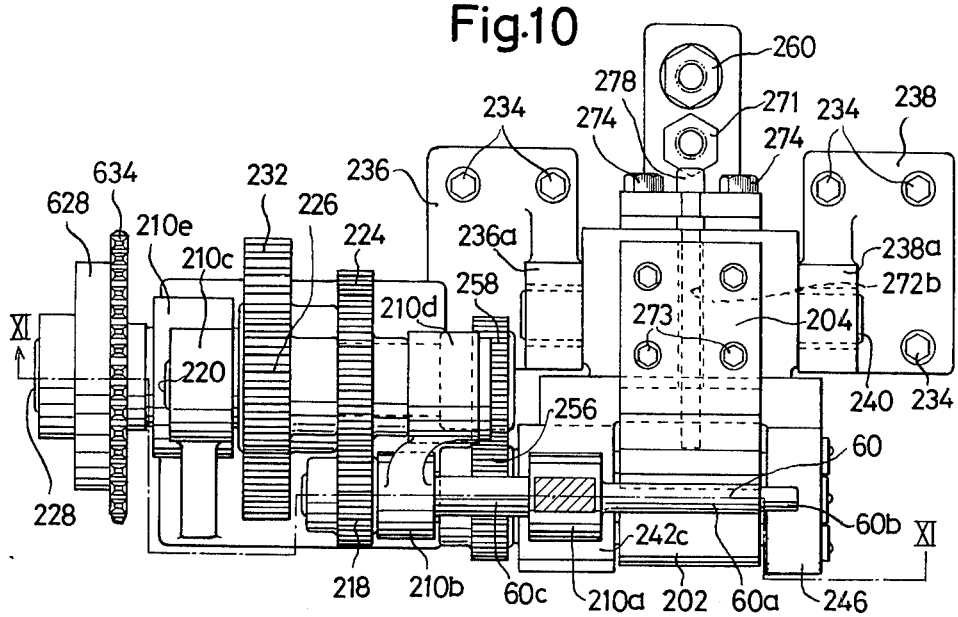
Figure 11:
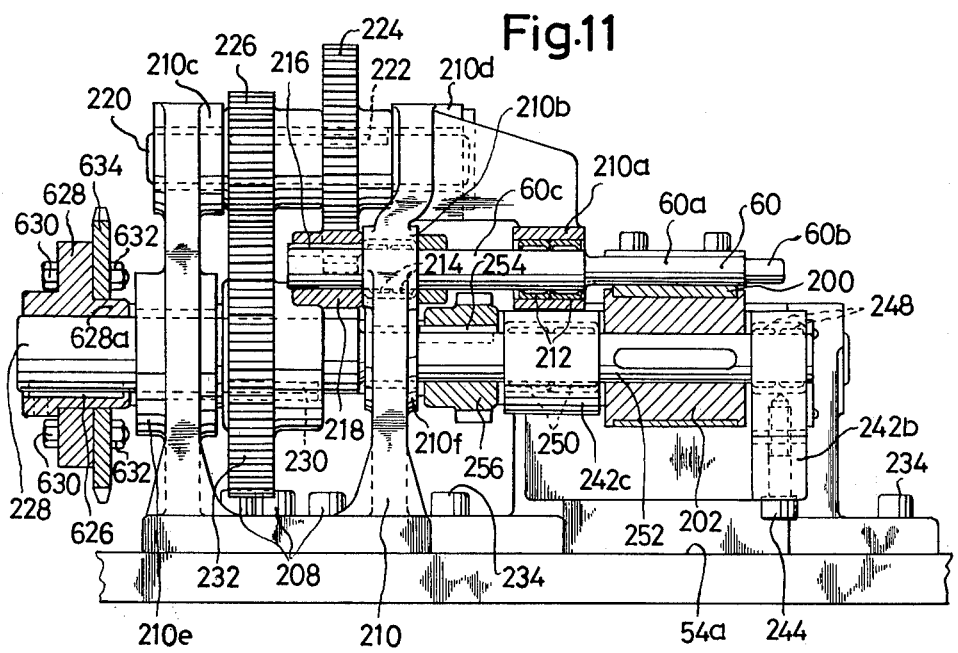
Figure 17:
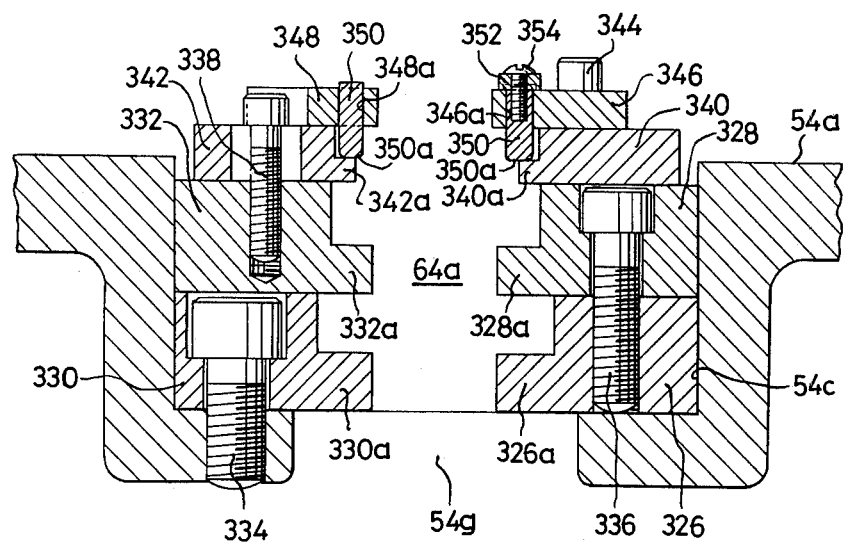
FIG. 17 is a sectional view of the front zone of the friction feed groove taken along the line XVII—XVII in FIG. 15, and FIG. 18 a sectional view of the front zone of the groove taken along the line XVIII—XVIII in FIG. 15.
Figure 19:
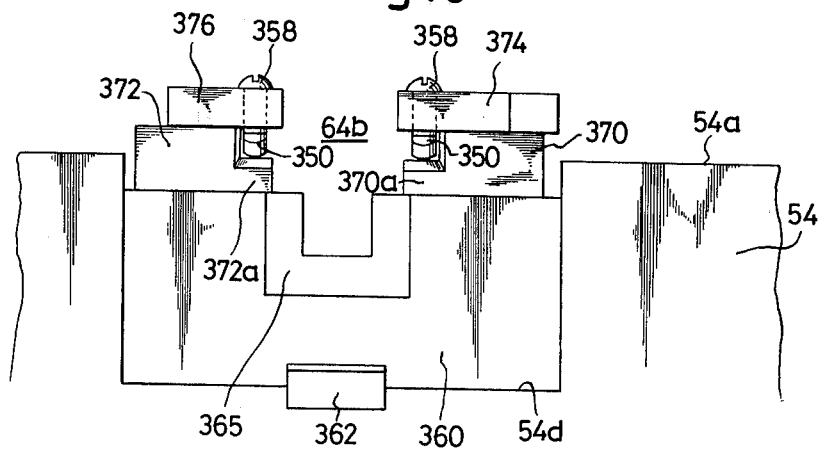
FIG. 19 is a front view of the back zone of the groove taken along the line XIX—XIX in FIG. 16, and FIG. 20 a sectional view of the back zone of the groove taken along the line XX—XX in FIG. 16.

As shown in FIGS. 10 and 11, an attaching flange 628 is fixedly fitted through a wedge 626 onto one end of the driving shaft 228 which causes the forming roll 60 and the feed roll 202 to be rotated, and onto the boss portion 628a of the flange 628 is fitted through bolts 630 and nuts 632 a sprocket 634. As shown in FIGS. 29 and 30, a roll driving mechanism 636 for tranmitting the action of the toothed wheel 492 fixed to the sub-shaft 490 to the sprocket 634 includes a spur wheel 638 engaged with the toothed wheel 492, a transmission shaft 642 both ends of which are freely rotatably supported by bearing portions 56j and 56k with bearing metals 640 interposed therebetween, said bearing portions 56j and 56k being projected from the inner wall of the frame 56 opposing to each other, and said spur wheel 638 being fixed to the shaft 642, a sprocket 644 coaxially fixed to the trasmission shaft 642, and an endless transmission chain 654 stretched between the sprockets 634 and 644 running through the holes 54i and 54j of the table deck 54 and contacting with a tension sprocket 652 attached, freely idling, through a bolt pin 650 to a bearing bracket 648 which is fixed through a bolt 646 on the upper face 54a of the table deck 54. The roll driving mechanism 636 causes the feed roll 202 to achieve a rotation every rotation of the transmission toothed wheel 492.

As shown in FIGS. 13, 27 and 31, a support finger driving mechanism 656 for transmitting the action of the recessed cam 502 attached to the sub-shaft 490 to the side-ward projection 308c of the swingable lever 308 which causes the support finger 206 to be moved up and down, comprises an attaching sleeve 658 fixedly fitted onto the boss portion 502a of the recessed cam 502, a forked member 660 freely rotatably catching the attaching sleeve 658 between the forked portion thereof, a cam follower 666 being attached through a nut 662 to the side of the forked member 660 and having a stud 664 engaged with the cam recess 502a of the cam 502, a lever 670 being fixed at one end thereof to a shaft 668 and connected through a pin 672 to the back end 660a of the forked member 660, another level 676 being fixed by a fastening bolt 674 at one end thereof to the shaft 668 and connected by a pin 680 at the other end thereof to an intermediate member 678, and a tie-rod 684 whose lower end is pinned through a pin 682 to the upper end of the intermediate member 678 and whose upper end is screwed through a nut 688 into the lower end of a connection member 686, the upper end of which is attached by a pin 690 to the side-ward projection 308c of the swingable lever 308. The support finger driving mechanism 656 causes the support finger 206 to achieve a stroke of its up- and downward reciprocation every rotation of the recessed cam 502.

As shown in FIGS. 25 and 26, an extractor driving mechanism 692 interposed between the lower end of the slider 446 passing through the bottom hole 438b of the extractor guide recess 72 and the recessed cam 500 includes a cam follower 696 having a stud 694 engaged with the cam recess 500a of the cam 500, a lever 698 to the lower end of which is rotatably attached through a nut 700 the cam follower 696, a shaft 704 being supported at both ends thereof by bearing portions 56m and 56n and secured thereto by a screw 702, said bearing portions 56m and 56n being projected from the inner wall of the frame 56 opposing to each other, and the central cylindrical portion 698a of said lever 698 being freely rotatably fitted through a bearing metal 706 onto the shaft 704 between the bearing portions 56m and 56n, and a connection member 710 being attached at one end thereof to the upper end of the lever 698 by a pin 712 and at the other end thereof to the lower end of the slider 446 by a pin 708. The extractor driving mechanism 692 causes the extractor 74 to attain a stroke of its backward and forward reciprocation every rotation of the recessed cam 500.

When the main crank shaft 480 and the sub-crank shaft 490 attain one revolution, respectively, the operational timing relation among the suction cup 62, the vacuum pump mechanism 542, the pre-curl punch 58, the carrier bar 66, the pusher 70, the feed roll 202, the support finger 206, and the extractor 74 is as shown by lines (F), (G), (H), (I), (J), (K), (L) and (M) in FIG. 32 and under completely synchronous control.

When the rotation angle of the main crank shaft 480 is in the range of 70° to 150°, the suction cup 62 comes to its top dead center position, as shown by the operation line (G) in FIG. 32, to contact with the rectangular blank Oa stacked at the lowermost end of the stacking station (Ba), while the vacuum pump mechanism 542 performs its vacuum suction when the shaft 480 rotates from 40° to 220° as shown by the operation line (F) in FIG. 32. As a result, the suction cup 62 sucks the rectangular blank Oa from the stacking station (Ba), beginning its lowering stroke while the shaft 480 rotates from 150° to 220°, and coming to its lowermost position when the shaft 480 rotates to 220°. At this instant, the vacuum pump mechanism 542 changes its vacuum suction stroke to its exhaustion stroke, so that the rectangular blank Oa is released from the suction cup 62 and mounted on the forked portion 66a of the carrier bar 66. As shown by the operation line (M) in FIG. 32, the rectangular blank Oa is caught at the back end thereof by the ratchet blocks 382 of the carrier bar 66 which is already forwarding from the time when the rotation angle of the shaft 480 is 180°, and shift-fed every one pitch (p) along the front zone 64a of the friction feed groove 64.

Feeding the rectangular blank Oa to be forced under the holder 156 against the elasticity of the coil springs 158 and 160, the shift ratchet 386 of the carrier bar 66 further urges both sides of the blank Oa to the forked dies 112 and 114 to determine the position of the blank Oa therein. The carrier bar 66 is then moved backward when the rotation angle of the shaft 480 is in the range of 0° to 180°, and in the while the pre-curl punch 58 is lowered, as shown by the operation line (H) in FIG. 32, to come to its bottom dead point at the time when the rotation angle of the shaft 480 is 100°, thus applying its punching impact to the areas 03 and 04 of the blank Oa to be pre-formed.

The pre-curl punch 58 finishes its punching process and is lifted while the shaft 480 rotates from 100° to 280°. Then, the carrier bar 66 is again forwarded, when the rotation angle of the shaft 480 is 180°, to further feed the pre-formed blank Oa, catching the back end of the blank Oa by its shift ratchet 386, every one pitch (p) along the back zone 64b of the friction feed groove 64.

The blank Oa fed by the carrier bar 66 from the friction feed groove 64 to the side feed groove 68 is further pushed, at the time when the carrier bar 66 is moved backward, by the pusher 70 to the forming station (Bc) in such a way that the pushing claw 70a of the pusher 70 catches the side end of the blank Oa, when the rotation angle of the shaft 480 is in the range of 0° to 90° as shown by the operation line (L) in FIG. 32.

In the while, the support finger 206 is lowered when the shaft 480 rotates from 10° to 70° and comes to its bottom dead point when the rotation angle of the shaft 480 is in the range of 70° to 190° as shown by the operation line (I), to thereby press and hold the free end 60b of the forming roll 60. At the same time, the blank Oa which is caught by the rubber plate 200 of the feed roll 202 when the shaft 480 rotates from 80° to 180° as shown by the operation line (k) in FIG. 32 is forcedly guided by the arc-shaped face 204a of the roll-up means 204 and rolled by the forming roll 60 to form a cylindrical body Ob.

Then, the support finger 206 is lifted when the rotation angle of the shaft 480 is in the range of 190° to 250° and the roll forming process is carried out as shown by the operation line (J) in FIG. 32. In the while the extractor 74 already held at its most forwarded position when the shaft 480 rotates from 55° to 235° is moved backward while the shaft 480 rotates from 235° to 325° to extract the cylindrical body Ob from the forming roll 60, around which the cylindrical body Ob is rolled up, catching the back end of the body Ob by its hook 452.

Every blank Oa is continuously subjected to same processes as described above, and every cylindrical body Ob extracted from the former (B) slides in a chute 714 to be transmitted on the line conveyors (C).

Figure 1:
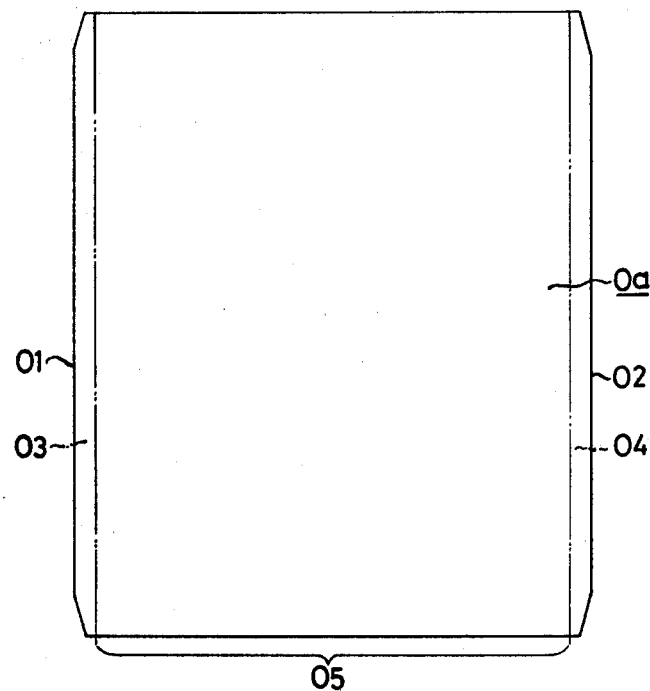
FIGS. 1 through 3 are plane views showing how a rectangular blank is formed to a cylindrical case stepwise in each section of an apparatus according to the present invention.
Figure 2:
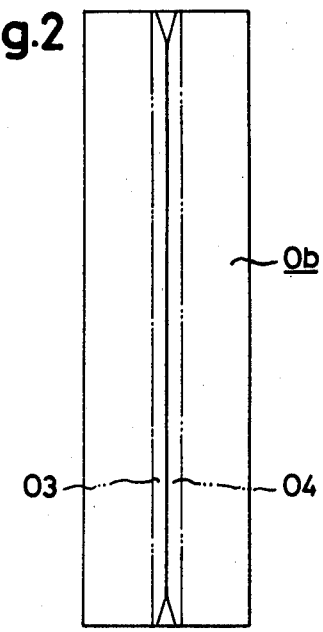
Figure 3:
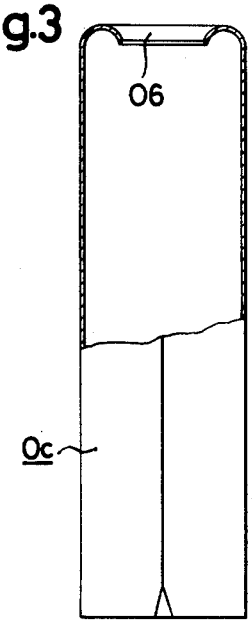
Figure 4:
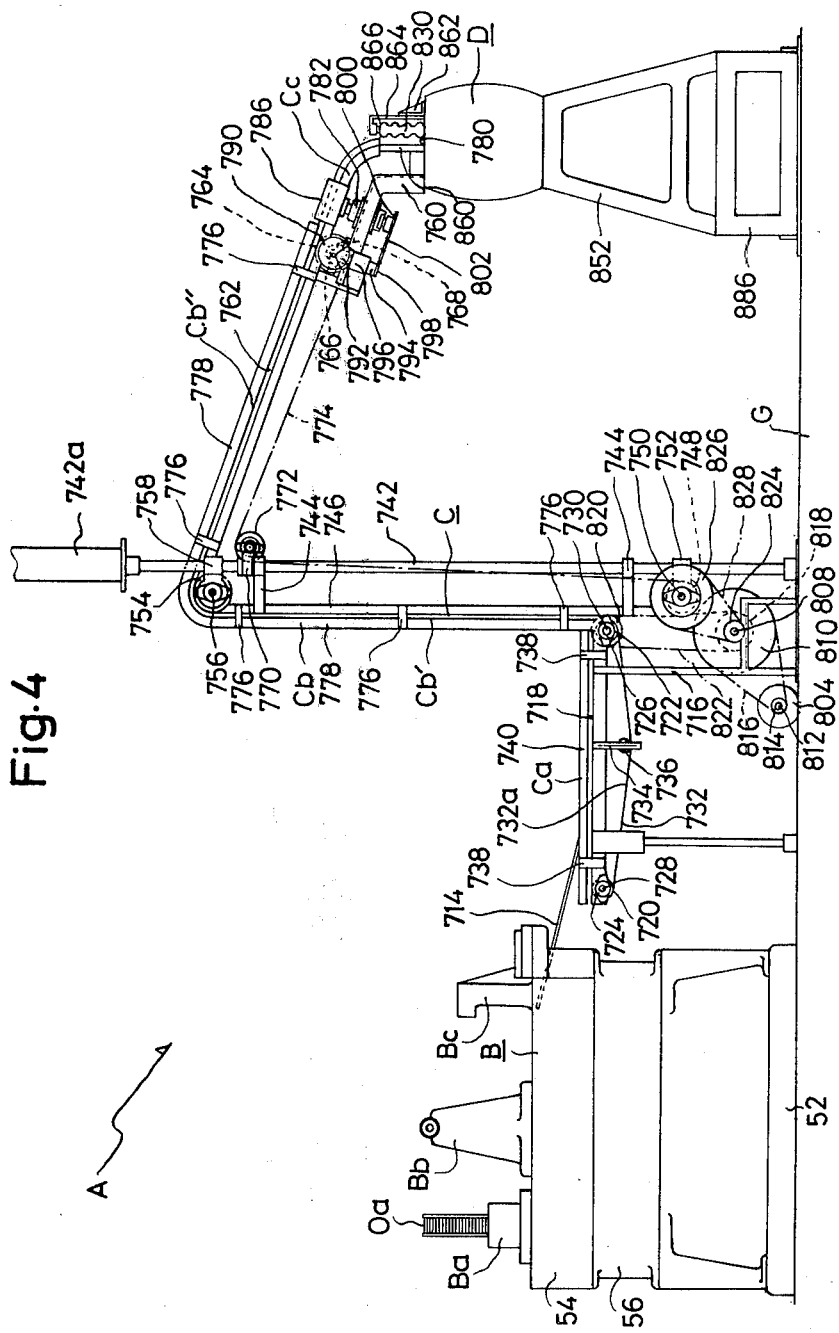
FIG. 4 is a side view showing the layout of a manufacture line provided with an apparatus according to the present invention.

As shown in FIG. 4, the line conveyors (C) include a horizontal belt conveyor (Ca), a magnet elevating conveyor (Cb) and a chute (Cc).

The horizontal belt conveyor (Ca) comprises two beams 718 mounted, parallel to each other, on the tops of legs 716, pulleys 720 and 722 arranged between and at both ends of the beams 718 and supported by pulley shafts 728 and 730, respectively, whose both ends are supported by bearing portions 724 and 726, a belt 732 endlessly stretched between the pulleys 720 and 722, arms 734 extending downward from the central portions of the parallel beams 718, a tension wheel 736 arranged between and at the lower ends of the arms 734, contacting with the returning portion 732a of the belt 732, and parallel guide walls 740 mounted through metal plates 738 on the parallel beams 718, respectively.

The magnet elevating conveyor (Cb) comprises a vertically elevating portion (Cb') and a downwardly slanting portion (Cb"). The vertically elevating portion (Cb') includes parallel support posts 742 erecting from the floor (G) and having at the tops thereof poles 742a hanging from the ceiling, a magnet plate 746 arranged along the parallel support posts 742 and attached thereto through brackets 744, a driving pulley 748 arranged adjacent to the lower end of the magney plate 746 and attached to a pulley shaft 750 whose both ends are supported by bearing brackets 752, and another magnet pulley 754 arranged adjacent to the top of the magnet plate 746 and attached to a pulley shaft 756 whose both ends are supported by bearing brackets 758 attached to the parallel support posts 742, respectively. On the other hand, the downwardly slanting portion (Cb") includes parallel beams 762 bridging the tops of the parallel support posts 742 and a base 760 overhung from the rotary flanger (D), and a pulley 764 arranged adjacent to the terminal ends of the parallel beams 762 and attached to a pulley shaft 766 whose both ends are supported by pillow blocks 768 fixed on the base 760. There is arranged an endless belt 774 running around the driving pulley 748, the magnet pulley 754, the driven pulley 764 and an intermediate pulley 772 which is supported by bearing brackets 770 attached to the parallel support posts 742. Parallel guide walls 778 are attached to both sides of the magnet plate 746 of the vertically elevating portion (Cb') by means of metal plates 776 and also mounted on the parallel beams 762 of the downwardly slanting portion (Cb") by means of metal plates 776.

The turn chute (Cc) is interposed between the terminal end of the downwardly slanting portion (Cb") of the magnet elevating conveyor (Cb) and a receiving opening 780 of the rotary flanger (D). As shown in FIG. 33, the turn chute (Cc) comprises a magnet turner 786 fixed to the top of a whirling shaft 784 penetrated through a bearing means 782 which is also penetrated through the base 760, said magnet turner 786 being contacted with the inner side of the chute (Cc), parallel guide walls 788 mounted on both sides of the chute (Cc), a bevel gear 790 fixed to the end of the pulley shaft 766, another bevel gear 792 engaged, perpendicular to each other, with the bevel gear 790 and fixed to the top of an intermediate shaft 794 which is penetrated through a bearing sleeve 796 attached to the base 760, a sprocket 798 attached to the lower end of the intermediate shaft 794, another sprocket 800 attached to the lower end of the whirling shaft 784, and a chain 802 endlessly stretched between the sprockets 798 and 800.

The line conveyors (C) are driven by a single driving motor 804. Namely, the driving torque of the driving motor 804 is transmitted through a driving chain 816, transmitting chains 822 and 828 and the connecting chain 802 to the horizontal belt conveyor (Ca), the magnet elevating conveyor (Cb) and the magnet turner 786, said driving chain 816 being endlessly stretched between a sprocket 810 attached to the central portion of a sprocket shaft 808 whose both ends are supported by pillow blocks (not shown) mounted on a base frame 806 and a sprocket 814 attached to a motor shaft 812 of the driving motor 804, said transmitting chain 822 being stretched between a sprocket 818 attached to one end of the sprocket shaft 808 and a sprocket 820 attached to one end of the pulley shaft 730 of the horizontal belt conveyor (Ca), and said transmitting chain 828 being stretched between a sprocket 824 attached to the other end of the sprocket shaft 808 and a sprocket 826 attached to one end of the pulley shaft 750 of the magnet elevating conveyor (Cb).

Every cylindrical body Ob fed from the chute 714 is conveyed on the horizontal belt conveyor (Ca) with its longitudinal axis directed in the feeding direction to the magnet elevating conveyor (Cb) where it is drawn by the magnet plate 746 to the belt 774 and elevated integral to the belt 774. Being turned around the magnet pulley 754 to the slanting direction, it is further conveyed on the downwardly slanting portion (Cb'') to the turn chute (Cc) where it is drawn to the magnet turner 786, which rotates anti-clockwise, and turned integral to the magnet turner 786 till its longitudinal axis becomes perpendicular to its conveyed direction. At this instant it is released from the magnet turner 786 to fall by gravity through the turn chute (Cc) into the receiving opening 780 of the subsequent rotary flanger (D).

As shown in FIGS. 34 through 42, the rotary flanger (D) comprises a timing screw 830 for supplying into the receiving opening 780 at a constant speed and a constant interval every cylindrical body Ob continuously falling from the turn chute (Cc) of the line conveyors (C), a feed turret 50 rotating at a constant speed and having a group of arc-shaped receiving seats 50a provided around the outer circumference thereof with same distance between the seats, each of said seats 50a receiving and holding therein by means of a holding claw 832 the cylindrical body Ob supplied from the receiving opening 780, chuck holders 838 and 840 each of the chuck holders 838 being opposed and freely approached to each of the chuck holders 840 with one of the seats 50a interposed therebetween and each of the chuck holders 838 being provided with a flanging disc 834 (see FIG. 39) at the foremost end thereof and each of the chuck holders 840 being provided with a pilot body 836 at the foremost end thereof, a pair of a stationary turret 842 and an adjustable turret 844 which are rotated synchronously with the feed turret 50, a body frame 854 mounted on the tops of leg frames 850 and 852 which are attached through bolts 848 to both sides of a base 846 on the floor (G), and a turret shaft 856 both ends of which are penetrated through and supported by bearing holes 854c and 854d provided in side portions 854a and 854b of the body frame 854, said feed turret 50 and said stationary turret 842 being fixedly fitted onto the turret shaft 856, and said adjustable turret 844 being fitted onto the turret shaft 856 so as to freely move in the axial direction of the shaft 856.

Referring to FIGS. 4 and 35, the receiving opening 780 is provided in a ceiling board 858 bridging the side portions 854a and 854b of the body frame 854, and a trough 860 through which the cylindrical bodies Ob fall is erected from the receiving opening 780 to the turn chute (Cc). The driving mechanism (Da) of the timing screw 830 for timing the cylindrical bodies Ob falling through the trough 860 includes a stand 864 attached to a bracket 862 which is fixed on the ceiling board 858, a vertical shaft 866 both ends of which are freely rotatably supported by the stand 864 and having the timing screw 830 fitted thereon, bearings 872 and 874 arranged on bearing bases 868 and 870 standing on both sides of the ceiling board 858, a bevel gear 876 fixed to the top of the vertical shaft 866 and engaged with another bevel gear 878 which is fixed to a transmission shaft 880 whose both ends are supported by the bearings 872 and 874, a sprocket 882 fixed to one end of the transmission shaft 880, a drive gear 884 attached to one end of the turret shaft 856 and engaged with an intermediate gear 886 fixed to a relay shaft 888, a sprocket 890 attached to the relay shaft 888, and a transmission chain 892 endlessly stretched between the sprockets 882 and 890. Therefore, the driving mechanism (Da) enables the timing screw 830 to be operated synchronously with the rotation of the turret shaft 856.

Referring to FIG. 38, a feed wheel 900 is attached, freely idling, through a ball bearing 898 and a bolt pin 896 to a forked bracket 894 and located under the receiving opening 780 with feeding guides 902 arranged at both sides thereof. Every cylindrical body Ob supplied at same interval by the timing screw 830 is pressed by a rubber 906 attached around the outer circumference of a rubber wheel plate 904 of the feed wheel 900, guided by the feeding guides 902 and restricted at one end thereof by a guide edge 908 projected at one side, to thereby be surely received in one of the arc-shaped receiving seats 50a of the feed turret 50.

As shown in FIGS. 36 and 37, the feed turret 50 fixed through fixing bolts 910 to the end face of the boss portion 842a of the stationary turret 842 includes arc-shaped receiving seats 50a provided around the outer circumference thereof, claw hollows 50b each arranged to correspond to each of the seats 50a, spring receiving brackets 914 whose base portions are fixed to lever shafts 912 penetrated through the claw hollows 50b, holding claws 832 whose base portions are attached, freely idling and sandwiching the base portions of the spring receiving brackets 914, to the lever shafts 912 and whose tips 832a are faced the arc-shaped receiving seats 50a, respectively, coil springs 918 interposed between spring receiving seats 916 screwed into the spring receiving brackets 914 and hollow seats 832b of the holding claws 832 so as to allow the holding claws 832 to softly hold with their tips 832a the cylindrical bodies Ob received in the receiving seats 50a without damaging the outer faces of the bodies Ob at the time when the bodies Ob are held by the holding claws 832, levers 920 whose one ends are fixed to one ends of the lever shafts 912 and whose other ends are connected with one ends of tension coil springs 924 which are pinned at the other ends thereof through spring pins 922 to the side of the feed turret 50, so as to always urge through the lever shafts 912 the holding claws 832 into the claw hollows 50b, and cam levers 926 whose one ends are fixed to the other ends of the lever shafts 912 and whose other ends are contacted with the outer circumference of a plate cam 934 attached through bolts 932 to a cam holder 930 which is attached at the lower end thereof through anchor bolts 928 on the central base portion 854e of the body frame 854. As the feed turret 50 rotates, some of the cam levers 926 are brought into contact with the plate cam 934 and the holding claws 832 corresponding to these cam levers 926 come out of their claw hollows 50b against the elasticity of the tension coil springs 924 to softly hold with their tips 832a the fallen cylindrical bodies Ob received in the receiving seats 50a over the range (P) during which the feed turret 50 rotates from under the receiving opening 780 to about 180°.

In FIG. 35 numeral 936 represents an auxiliary plate attached integral to one side of the feed turret 50 by means of screws 938.

Referring to FIG. 38, the chuck holders 838 are freely slidably arranged in the stationary turret 842 with same distance therebetween in the circumferential direction of the turret 842, while the chuck holders 840 are freely slidably arranged in the adjustable turret 844 in same way. The threaded end 838a of the chuck holder 838 is screwed into the threaded bore 834b of the flanging disc 834 having a ring-shaped recess 834a (see FIG. 39) into which one end of the cylindrical body Ob is forced to form its flange 06, while the threaded end 840a of the corresponding chuck holder 840 is screwed into the threaded bore 836a of the pilot body 836 which is fitted into the cylindrical body Ob to press the body Ob against the flanging disc 834. Cam rolls 944 and 946 are attached, freely idling, through cam roll pins 940 and 942 to the other forked ends 838b and 840b of the chuck holder 838 and the corresponding chuck holder 840, respectively. Connection members 952 and 954 projecting from the inner sides of the forked ends 838b and 840b and attached through bolts 948 and 950 thereto have slide pins 960 and 962 connected through bolts 964 and 966 thereto at the outer ends of the pins 960 and 962 which serve to force tension coil springs 956 and 958 into blind holes 842b and 844a, respectively, said blind hole 842b being provided in the stationary turret 842, parallel to the chuck holer 838 and said blind hole 844a being provided in the adjustable turret 844, parallel to the chuck holder 840. As apparent from the above, the chuck holder 838 and the corresponding chuck holder 840 are always urged to part from each other by the elasticity of the tension coil springs 956 and 958 through the slide pins 960 and 962.

The cam roll 944 is contacted with the ring-shaped end face 968a of a flanging disc cam 968 fixed to the left-side portion 854b of the body frame 854, and the cam roll 946 is also contacted with the ring-shaped end face 978a of a flanging disc ram 978 which includes a part of an arc-shaped adjusting cam 976 attached through a key 974 to a slide 972 of a cam adjusting mechanism (Db), said cam adjusting mechanism being freely slidably attached through bolts 970 to the right-side portion 854a of the body frame 854. Therefore, over the range (Q) during which the rotating turret 50 rotates to bring the receiving seat 50a (see FIG. 37), which is located under the receiving opening 780, to a position of about 140°, the chuck holders 838 and the corresponding chuck holders 840 are forced to approach one another against the elasticity of the tension coil springs 956 and 958 by the action between the ring-shaped end faces 968a, 978a of the flanging disc cams 968, 978 and the cam rolls 944, 946, and a pilot head 984 screwed into the outer end of each of pilot pins 980 with a tension coil spring 982 interposed therebetween, said pilot pin 980 being freely movably fitted into the foremost end of the pilot body 836, is pressed into a corresponding bore 834c of the flanging disc 834 against the elasticity of the tension coil spring 982. When the rotary turret 50 rotates over the range (R), the cam roll pins 940 and 942 are engaged with the cam recesses 968b and 978b of the flanging disc cams 968 and 978, respectively, to surely force the flanging disc 834 to be parted from the corresponding pilot body 836 to the greatest extent (see FIG. 35).

When one of the arc-shaped receiving seats 50a of the feed turret 50 comes right under the receiving opening 780, the cylindrical body Ob intermittently fed by the timing screw 830 is received in the receiving seat 50a, and softly held by the holding claw 832 immediately after the seat 50a passes under the receiving opening 780. At the same time, the flanging disc 834 and the corresponding pilot body 836 are caused to approach each other and the pilot body 836 coming into the cylindrical body Ob from one end thereof forcedly press the other end of the body Ob into the ring-shaped recess 834a of the flanging disc 834 to thereby form an outer cylindrical case Oc having a flange 06 formed at one end thereof. When the feed turret 50 rotates from the range (Q) to the range (R), the flanging disc 834 and the pilot body 836 are caused to part from each other, and when the feed turret 50 further rotates to come to the end of the range (P), the pilot body 836 is caused to completely come out of the outer cylindrical case Oc.

Therefore, the outer cylindrical case Oc released from the holding claw 832 falls by gravity on a discharge chute 996 to be discharged from the rotary flanger (D), said discharge chute 996 being attached through screws 994 to the inner face of an arc-shaped guide 992, the lower end of which is fixed through bolts 990 on a support bracket 988, and said support bracket being fixed through anchor bolts 986 on a base 854f provided at the center portion of the body frame 854 as shown in FIGS. 36 and 38.

In FIG. 40, numeral 998 represents a hand wheel for a cam adjusting mechanism (Db), said hand wheel being fixed to the outer end of an adjusting screw 1000, the inner end of which is screwed through the right-side portion 854a of the body frame 854. The bent end 972a of the slide 972 is attached, freely idling, through a stop collar 1002 to the adjusting screw 1000 and arranged integral to the cam 976 (see FIG. 38). Therefore, the operation of the hand wheel 998 enables the slide 972, that is, the cam 976 to be finely adjusted in the horizontal direction. Symbol (Dc) represents a turret adjusting mechanism comprising a yoke 1004 engaged with the ring recess 844c which is provided around the outer circumference and at the end of the boss portion 844b of the adjustable turret 844, a turret adjusting screw 1008 screwed through the right-side portion 854a of the body frame 854 and connected at the inner end thereof with the yoke 1004 through a collar 1006, and an adjusting screw hand wheel 1010 fixed to the outer end of the turret adjusting screw 1008. The operation of the adjusting screw hand wheel 1010 enables the adjustable turret 844 to be freely adjusted along the key recess 856a of the turret shaft 856. Numeral 1012 denotes a stop ring.

Referring to FIG. 34, the driving torque generated by a motor 1014, which is fixed on the base 846, is transmitted to the turret shaft 856 through a driving mechanism 1016, a clutch mechanism 1020 attached to one end of a relay shaft 1018, and a pinion 1022 attached to the relay shaft 1018 and engaged with the drive gear 884.

The driving mechanism 1016 includes, as shown in FIG. 34, a drive shaft 1024 both ends of which are supported by the bearing sleeves 850a and 852a projected inward to oppose to each other from the left and the right leg frames 850 and 852, a pulley 1026 wedged to the drive shaft 1024 adjacent to the bearing sleeve 85a, another pulley 1030 fixed to the outer end of a motor shaft 1028, two V-belts 1032 stretched, parallel to each other, between the pulleys 1026 and 1030, a sprocket 1034 wedged to the end of the drive shaft 1024 penetrated through the bearing sleeve 852a, the relay shaft 1018 both ends of which are supported by the bearing sleeves 854g and 854h of the body frame 854, a freely idling clutch sprocket 1036 of the clutch mechanism 1020 wedged through a key 1040 to the left end of the relay shaft 1018 penetrated through the bearing sleeve 854h, and two chains 1038 stretched, parallel to each other, between the sprockey 1034 and the clutch sprocket 1036.

Referring to FIGS. 41 and 42, the clutch mechanism 1020 includes a clutch sleeve 1042 fixed to the left end of the relay shaft 1018, a clutch spool 1046 fitted, freely slidably in the axial direction, through a key 1044 on the cylindrical portion 1042a of the clutch sleeve 1042, a clutch sprocket 1036 attached, freely idling, through a bushing 1048 to the cylindrical portion 1042a of the clutch sleeve 1042 and between the flanging portion 1042b of the clutch sleeve 1042 and the flanging portion 1046a of the clutch spool 1046, a spring adjusting nut 1050 attached to the outer end of the clutch sleeve 1042 by an end bolt 1054 through a washer 1052, a tension coil spring 1056 interposed between the end of the clutch spool 1046 and the spring adjusting nut 1050, and clutch facings 1058 and 1060 attached to the flanging portions 1042b and 1046a, respectively, wherein the flanging portion 1046a of the clutch spool 1046 is caused to pressedly urge the clutch sprocket 1036 to the flanging portion 1042b of the clutch sleeve 1042 due to the elasticity of the tension coil spring 1056 and the clutch sprocket 1036 is pressedly held by the clutch facings 1058 and 1060 at both sides thereof, to thereby always transmit the driving torque of the clutch sprocket 1036 through the clutch sleeve 1042 to the relay shaft 1018.

The clutch mechanism 1020 further includes a pair of clutch lever brackets 1064 and 1066 projecting in cantilver-like through bolts 1062 from both side ends of the left-side portion 854b of the body frame 854, a clutch shaft 1068 both ends of which are supported by the clutch lever brackets 1064 and 1066, a lever holder 1070 wedged to the central portion of the clutch shaft 1068, shifter fork levers 1074 and 1076 whose base portions are attached through bolts 1072 to both sides of the lever holder 1070, respectively, and fork pins 1078 and 1080 attached to the upper ends of the shifter fork levers 1074 and 1076, respectively, so as to engage with a ring-shaped recess 1046b provided at the outer end and around the outer circumference of the clutch spool 1046, wherein when the clutch shaft 1068 rotates anticlockwise, the clutch spool 1046 is shifted through the shifter fork levers 1074, 1076 and against the elasticity of the tension coil spring 1056 in the left-ward direction of the relay shaft 1018 to thereby bring the clutch sprocket 1036 released from the press contact with the flange portion 1042b of the clutch sleeve 1042, thus causing the clutch mechanism 1020 to be shut off.

The clutch mechanism 1020 still further includes a shifter shaft lever 1082 fixed through a wedge 1084 to the penetrated right end of the clutch shaft 1068, a shifter lever cam adjusting screw 1088 vertically screwed through the free end of the shifter shaft lever 1082 with an adjusting nut 1086 screwed at the upper end thereof, a shaft 1092 one end of which is penetrated through the clutch lever bracket 1064 at the lower portion thereof and attached through a bolt 1090 thereto in cantilever-like manner, a clutch lever 1094 having the shaft 1092 penetrated at the lower portion thereof, a cam adjusting lever 1096 freely rotatably attached to the shaft 1092, and a shifter lever cam 1104 attached to the upper end of the cam adjusting lever 1096 and engaged with the bottom end 1088a of the shifter lever cam adjusting screw 1088, the lower end of the clutch lever 1094 and the lower end of the cam adjusting lever 1096 being connected with each other through a connecting bolt pin 1098 and a nut 1100, and the lower end of the clutch lever 1094 being fixed to the connecting bolt pin 1098 by a pair of fastening bolts 1102, wherein when the clutch lever 1094 is rotated from its erecting position to anti-clockwise direction, the cam adjusting lever 1096 is caused to rotate anti-clockwise around the shaft 1092, so that the shifter lever cam 1104 is brought into contact with the bottom end 1088a of the shifter lever cam adjusting screw 1088, to thereby lift the screw 1088 so as to rotate both of the lever 1082 and the shaft 1068 anti-clockwise, thus causing the clutch mechanism 1020 to be shut off. To the contrary, when the clutch lever 1094 is returned ot its original erecting position, the shifter lever cam 1104 is released from its contact with the bottom end 1088a of the shifter lever cam adjusting screw 1088 and the clutch spool 1046 is shifted in the axial direction by the elasticity of the tension coil spring 1056 to bring the clutch mechanism 1020 into connected condition, so that the driving torque of the clutch sprocket 1036 is transmitted to the relay shaft 1018 to rotate the turret shaft 856 through the engagement between the pinion 1022 and the drive gear 884, said pinion 1022 being attached to the relay shaft 1018 by means of a wedge 1106 and a screw 1108.

In FIG. 42, numerals 1110 and 1112 represent stop rings attached through flat headed bolts 114 to both ends of the clutch shaft 1068, respectively. In FIG. 34, numeral 1116 denotes a hand wheel attached to the penetrated right end of the relay shaft 1018 so as to rotate by hand the relay shaft 1018, numerals 1118, 1120 and 1122 represent covers, and numeral 1124 represents a net cover frame attached to the ceiling board 858 by means of hinges 1126 so as to be freely closed and opened.

As already described above, the cylindrical bodies Ob are processed in the rotary flanger (D) to the outer cylindrical cases Oc each having a flange 06 formed at one end thereof and continuously discharged from the discharge chute 996 at the rate of about 320 cases every minute.

What is claimed is:

1. Apparatus for use in an automatic and continuous manufacture line for manufacturing the outer cylindrical cases of dry cells from blanks comprising a stacking station having stacking means for stacking said blanks, a pre-forming station having a pre-curling means for forming an arc-shaped pre-curl on said blanks, a first carrying means for receiving the blanks from the stacking means and moving the blanks through said pre-curling means, a forming station having forming means for forming the pre-curled blanks into cylindrical bodies, a second carrying means for moving the blanks to the forming station, line conveyors conveying the formed cylindrical bodies from the forming station, a rotary flanger means to which the formed cylindrical bodies are conveyed by the line conveyors, and pressing means on said rotary flanger for pressing both ends of the cylindrical bodies in such a manner that only one longitudinal end of the cylindrical body is inwardly bent to form a flange.

2. Apparatus for use in an automatic and continuous manufacture line for manufacturing the outer cylidrical cases of dry cells according to claim 1, wherein said blanks have a rectangular configuration, said pre-curling means pre-curling the longer sides of said rectangular blanks.

3. Apparatus for use in an automatic and continuous manufacture line for manufacturing the outer cylindrical cases of dry cells according to claim 1, wherein said second carrying means comprises a pusher which pushes said pre-curled blank into said forming station in a direction perpendicular to the direction at which the pre-curled blanks are moved by the first carrying means.

4. Apparatus for use in an automatic and continuous manufacture line for manufacturing the outer cylindrical cases of dry cells according to claim 3, wherein said first carrying means moves said blanks to said pre-curling means and moves said pre-curled blanks from said pre-curling means to the longitudinal end of said first carrying means, said pusher moving said pre-curled blanks when the latter are at the longitudinal end of said first carrying means.

5. Apparatus for use in an automatic and continuous manufacture line for manufacturing the outer cylindrical cases of dry cells according to claim 1, wherein said forming means comprises a forming roll around which the cylindrical bodies are formed and extracting means for extracting the cylindrical bodies from the forming roll.

6. Apparatus for use in an automatic and continuous manufacture line for manufacturing the outer cylindrical cases of dry cells according to claim 1, wherein the line conveyors comprise turning means for turning the pre-curled blanks 90 degrees prior to conveying the pre-curled blanks to the rotary flanger.

7. Apparatus for use in an automatic and continuous manufacture line for manufacturing the outer cylindrical cases of dry cells according to claim 1, wherein said line conveyors comprise a horizontal conveyor means for horizontally conveying the cylindrical bodies discharged from the former means in such a way that the longitudinal axis of the cylindrical body is disposed parallel to the conveying direction and a second conveyor means comprising a vertically elevating portion and a downwardly inclined portion in which the cylindrical bodies conveyed from the horizontal conveyor means are at first vertically elevated and then conveyed in a downwardly inclined direction, and a turning means arranged at the terminal end of the downwardly inclined portion and turning the cylindrical bodies in a direction perpendicular to the conveying direction.

8. Apparatus for use in an automatic and continuous manufacture line for manufacturing the outer cylindrical cases of dry cells according to claim 1, wherein said rotary flanger comprises means defining a plurality of receiving openings for receiving the cylindrical bodies, said rotary flanger further comprising timing means operable to effect feeding of the cylindrical bodies to the receiving openings as the cylindrical bodies are continuously fed by said line conveyors.

9. Apparatus for use in an automatic and continuous manufacture line for manufacturing the outer cylindrical cases of dry cells according to claim 8, wherein said rotary flanger comprises a rotary feed turret having a plurality of arc-shaped receiving seats for receiving said cylindrical bodies from said receiving openings, said rotary feed turret further comprising holding means for holding the cylindrical bodies in said receiving seats.

10. Apparatus for use in an automatic and continuous manufacture line for manufacturing the outer cylindrical cases of dry cells according to claim 9, wherein said rotary flanger further comprises a first turret and an adjustable rotary turret which is rotatable in synchronously with the rotary feed turret, said first turret having flanging means and said adjustable rotary turret having piloting means, said flanging means being movable toward said piloting means with one of said receiving seats interposed therebetween, whereby the cylindrical body on the receiving seat is pressed between said flanging means and said piloting means.

11. Apparatus for use in an automatic and continuous manufacture line for manufacturing the outer cylindrical cases of dry cells according to claim 1 comprising a suction means operable to draw one rectrangular blank at a time from the underside of the stacking means in which the rectangular blanks are stacked, said first carrying means comprising a carrier bar and a friction feed groove, said carrier bar being arranged to be freely reciprocated and guided along said friction feed groove, said friction feed groove extending from the stacking station through the pre-forming station so as to provide for shift carrying the rectangular blank therealong, said second carrying means comprising pushing means and a side feed groove arranged at the end of said friction feed groove and extending perpendicular to said friction feed groove to said forming station, said pushing means being arranged to be freely reciprocated and guided along said side feed groove and being operable to push the rectangular blank, which is fed to the end of the friction feed groove by said carrier bar to the forming station, and extracting means having a sliding guide groove extending adjacent the forming station, said extracting means being arranged to be freely reciprocated and guided along the sliding guide groove and being operable to extract the cylindrical body from the forming means.

12. Apparatus for use in an automatic and continuous manufacture line for manufacting the outer cylindrical cases of dry cells according to claim 10, wherein the rotary feed turret is mounted on a turret shaft, the first turret being disposed at one side of the feed turret and being fixedly attached to said turret shaft, the adjustable turret being disposed at the other side of the feed turret and being movable axially on the turret shaft.

13. Apparatus for use in an automatic and continuous manufacture line for manufacturing the outer cylindrical cases of dry cells according to claim 1, wherein said first carrying means comprises a carrier bar movable along a friction feed groove, said friction feed groove having a starting end portion, said stacking means bridging said friction feed groove at said starting end portion, and suction means comprising a vacuum pumping means and a suction member communicating with said vacuum pumping means, said suction member being reciprocable at a location underlying said stacking means.

14. Apparatus for use in an automatic and continuous manufacture line for manufacturing the outer cylindrical cases of dry cells according to claim 1, wherein said second carrying means comprises a pusher reciprocable along a side feed groove, said forming means comprising a forming roll on which said cylindrical body is formed, said forming roll being disposed at a longitudinal end portion of said side feed groove, and reciprocably mounted supporting means for supporting the forming roll as the cylindrical body is formed thereon.

15. Apparatus for use in an automatic and continuous manufacture line for manufacturing the outer cylindrical cases of dry cells according to claim 1, wherein said first carrying means comprises a carrier bar reciprocable in a friction feed groove, the pre-curling means comprising forked dies arranged at a central portion of the friction feed groove and opposed to each other with a space therebetween allowing the passage of the carrier bar, a pre-curl punch freely movable up and down to apply a pre-curling impact to the rectangular blank on the forked dies, and a holder for holding onto the forked dies the rectangular blank shift-fed by the carrier bar along the friction feed groove.

16. Apparatus for use in an automatic and continuous manufacture line for manufacturing the outer cylindrical cases of dry cells according to claim 14, wherein said forming roll is disposed in a direction transversing said side feed groove, said forming means further comprising a feed roll having a buffer plate attached thereto at its outer circumference, said buffer plate contacting the lower side of the forming roll, and a roll-up means provided with an arc-shaped face which faces the back side of the forming roll.

17. Apparatus for use in an automatic and continuous manufacture line for manufacturing the outer cylindrical cases of dry cells according to claim 13, wherein the first carrying means comprise a pair of guide plates arranged to oppose each other, said carrier bar being provided with a forked portion through which the suction member can pass in the up and down direction, ratchet blocks mounted on said forked portion, said guide plates having inwardly projecting flanges, equally spaced bite members having lower ends supported on said guide plates, elastic means to elastically urge said bite members in one direction, a shift ratchet capable of lever-like action and being pivoted in each of ratchet holes provided in the carrier bar with the same distance therebetween in the longitudinal direction of the carrier bar and operable when the carrier bar is moved forward to catch the back end of the rectangular blank by its tip projected a little from the ratchet hole to force both sides of the blank into and between the lower ends of the bite members and the flanges of the guide plates and to shift-feed the blank along the guide plates at the same pitch interval, while when the carrying bar is returned, the shift ratchet is pressed into the ratchet hole to hide its tip in the ratchet hole and to bring its tip into sliding contact with the underside of the blank which is prevented from returning with its both sides pressedly caught between the lower ends of the tops and the flanges of the guide plates.

18. Apparatus for use in an automatic and continuous manufacture line for manufacturing the outer cylindrical cases of dry cells according to claim 1, comprising suction means arranged freely movable in the up and down direction to engage the rectangular blanks in the stacking means; the suction means, the first carrying means, the pre-curling means, the second carrying means, and the forming means, each being provided with driving means, and operable means mechanically connecting the respective driving means to a main crank shaft, whereby the various driving means are synchronously operated relative to one another by driving the main crank shaft, and a single driving source for driving said main crank shaft.

19. Apparatus for use in an automatic and continuous manufacture line for manufacturing the outer cylindrical cases of dry cells according to claim 9, wherein the holding means comprises holding claws each being pivoted in a claw hole radially provided around the outer circumference of the feed turret and corresponding to each of the arc-shaped receiving seats thereof, whereby when one of the receiving seats in which the cylindrical body is received is rotated with the feed turret to come to an operable position, the holding claw is projected at the tip thereof from the claw hole to securely and elastically hold the cylindrical body in the receiving seat.

20. Apparatus for use in an automatic and continuous manufacture line for manufacturing the outer cylindrical cases of dry cells according to claim 10, wherein each of the flanging means is slidably arranged with the same distance therebetween around ther outer circumference of the first turret, said piloting means being slidably arranged with the same distance therebetween around the outer circumference of the adjustable turret to correspond to the respective flanging means, cam means operable to cause said flanging means and piloting means to move towards each other, whereby when the feed turret rotates to an operable position, the flanging means and its corresponding piloting means are caused by the action of the cams to approach each other so that one end of the cylindrical body received and held in the receiving seat of the feed turret is bent inwardly to form a flange, and when the turret further rotates beyond said operable position, the flanging means and piloting means are caused to move away from each other so that the receiving seat is brought into a condition wherein the cylindrical body is discharged from the receiving seat by releasing the holding means from the body.

21. Apparatus for use in an automatic and continuous manufacture line for manufacturing the outer cylindrical cases of dry cells according to claim 9, wherein the rotary feed turret has a turret shaft and wherein the timing means is operably connected to the turret shaft so that the timing means is driven synchronously with the rotation of the turret shaft.

22. Apparatus for use in an automatic and continuous manufacture line for manufacturing the outer cylindrical cases of dry cells according to claim 10, wherein the piloting means and the adjustable turret are provided with adjusting means, said adjusting means permitting adjustment of the piloting means and adjustable turret relative to each other and in the axial direction.

23. Apparatus for use in an automatic and continuous manufacture line for manufacturing the outer cylindrical cases of dry cells according to claim 1, further comprising a driving source for driving a drive shaft, said rotary flanger comprising a rotary feed turret having a turret shaft, and a relay shaft arranged between the turret shaft and the drive shaft, said relay shaft being provided with a clutch means allowing the driving torque of the drive shaft to be transmitted through the relay shaft to the turret shaft or to be shut off from the turret shaft.

* * * * *